United States Patent
Uh et al.

(10) Patent No.: US 10,788,692 B2
(45) Date of Patent: Sep. 29, 2020

(54) THIN FILM TRANSISTOR PANEL AND LIQUID CRYSTAL DISPLAY USING THE SAME

(75) Inventors: Kee-Han Uh, Yongin-si (KR);
Hyung-Guel Kim, Yongin-si (KR);
Sang-Woo Kim, Suwon-si (KR);
Seung-Kyu Lee, Yongin-si (KR);
Bo-Young An, Suwon-si (KR);
Won-Sang Park, Yongin-si (KR);
Jae-Hyun Kim, Suwon-si (KR);
Hae-Young Yun, Suwon-si (KR);
Jae-Young Lee, Seoul (KR);
Poundaleva Irina, Yongin-si (KR);
Sung-Eun Cha, Geoje-si (KR);
Young-Joo Chang, Suwon-si (KR);
Jae-Ik Lim, Chuncheon-si (KR);
Ki-Hun Jeong, Seoul (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 1430 days.

(21) Appl. No.: 12/623,049

(22) Filed: Nov. 20, 2009

(65) Prior Publication Data

US 2010/0066655 A1     Mar. 18, 2010

Related U.S. Application Data

(63) Continuation of application No. 11/302,968, filed on Dec. 14, 2005, now Pat. No. 7,633,473.

(30) Foreign Application Priority Data

Dec. 14, 2004  (KR) .................. 10-2004-0105548
Dec. 21, 2004  (KR) .................. 10-2004-0109641

(Continued)

(51) Int. Cl.
*G09G 3/36* (2006.01)
*G02F 1/1333* (2006.01)
(Continued)

(52) U.S. Cl.
CPC ........ *G02F 1/1333* (2013.01); *G02F 1/13439* (2013.01); *G02F 1/133514* (2013.01);
(Continued)

(58) Field of Classification Search
CPC ..... G02F 1/36286; G02F 2001/133317; G02F 2001/133391; G09F 9/35; G09G 3/00
(Continued)

(56) References Cited

U.S. PATENT DOCUMENTS 5,990,877 A * 11/1999 Yeo ...................... G09G 3/3688
345/204
6,046,633 A *  4/2000 Shimizu ............... G09G 3/2011
330/51

(Continued)

FOREIGN PATENT DOCUMENTS

CN     1293380     5/2001
CN     1395140     2/2003
(Continued)

OTHER PUBLICATIONS

Extended European Search Report dated Feb. 20, 2007 for Application No. 05026359.9-1228.
(Continued)

*Primary Examiner* — William Boddie
*Assistant Examiner* — Jeffrey Parker
(74) *Attorney, Agent, or Firm* — F. Chau & Associates, LLC

(57) ABSTRACT

An LCD device includes a transmissive LCD panel assembly, a backlight assembly for supplying light to the LCD panel assembly, and a selective reflection film provided
(Continued)

between the backlight assembly and the LCD panel assembly. A display region of the LCD has a low-resolution area and a high-resolution area, and a pixel formed in the low-resolution area that is larger than a pixel formed in the high-resolution area.

9 Claims, 21 Drawing Sheets

(30) Foreign Application Priority Data

Dec. 29, 2004 (KR) ........................ 10-2004-0115067
Dec. 30, 2004 (KR) ........................ 10-2004-0117256

(51) Int. Cl.
*G02F 1/1335* (2006.01)
*G02F 1/13357* (2006.01)
*G02F 1/1343* (2006.01)
*G02F 1/1362* (2006.01)

(52) U.S. Cl.
CPC .. *G02F 1/133555* (2013.01); *G02F 1/133615* (2013.01); *G02F 1/136286* (2013.01); *G02F 2001/133317* (2013.01); *G02F 2001/133391* (2013.01)

(58) Field of Classification Search
USPC ............................................. 345/87–89, 103
See application file for complete search history.

(56) References Cited

U.S. PATENT DOCUMENTS

| | | | |
|---|---|---|---|
| 6,697,039 B1* | 2/2004 | Yamakawa et al. | ............ 345/98 |
| 6,850,352 B1* | 2/2005 | Childers | ........................ 359/237 |
| 6,937,303 B2 | 8/2005 | Jang et al. | |
| 7,274,415 B2* | 9/2007 | Nakayoshi et al. | ............ 349/65 |
| 2002/0167460 A1* | 11/2002 | Baudisch | .............. G06F 3/1438 |
| | | | 345/3.3 |
| 2003/0067007 A1 | 4/2003 | Morosawa | |
| 2003/0112391 A1 | 6/2003 | Jang et al. | |
| 2005/0030254 A1* | 2/2005 | Jung | ..................... G06F 3/1431 |
| | | | 345/1.1 |
| 2005/0134549 A1* | 6/2005 | Kamiya | ............... G09G 3/3648 |
| | | | 345/103 |
| 2006/0158588 A1 | 7/2006 | Uh et al. | |
| 2008/0143940 A1 | 6/2008 | Yoshida et al. | |

FOREIGN PATENT DOCUMENTS

| | | |
|---|---|---|
| DE | 199 63 067 | 7/2001 |
| EP | 1093009 | 4/2001 |
| EP | 1389775 | 2/2004 |
| EP | 1 462 842 | 9/2004 |
| JP | 05-108036 | 4/1993 |
| JP | 2001-005431 | 1/2001 |
| JP | 2001-075503 | 3/2001 |
| JP | 2001-188248 | 7/2001 |
| JP | 2001-188486 | 7/2001 |
| JP | 2001-298519 | 10/2001 |
| JP | 2001-305525 | 10/2001 |
| JP | 2002-189230 | 7/2002 |
| JP | 2003-188959 | 7/2003 |
| JP | 2003-216073 | 7/2003 |
| JP | 2003-255338 | 9/2003 |
| JP | 2004-070225 | 3/2004 |
| JP | 2005-173565 | 6/2005 |
| KR | 100307027 | 8/2001 |
| KR | 200266573 | 2/2002 |
| KR | 1020020035945 | 5/2002 |
| KR | 1020020072387 | 9/2002 |
| KR | 1020030074977 | 9/2003 |
| KR | 1020040051079 | 6/2004 |
| TW | 521250 | 2/2003 |
| TW | 522370 | 3/2003 |
| TW | 563053 | 11/2003 |

OTHER PUBLICATIONS

English Abstract for Publication No. 563053.
English Abstract for Publication No. 521250.
English Abstract for Publication No. 522370.

* cited by examiner

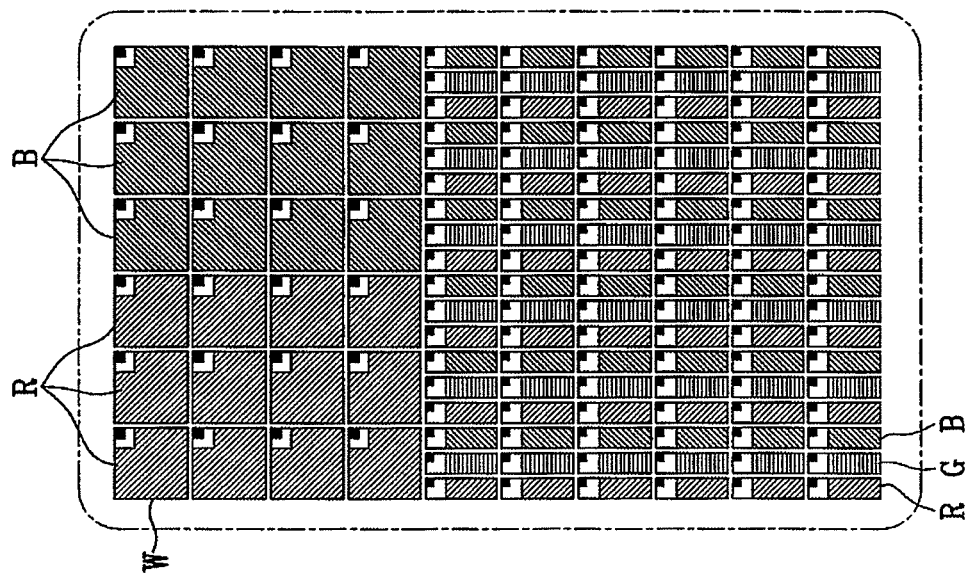
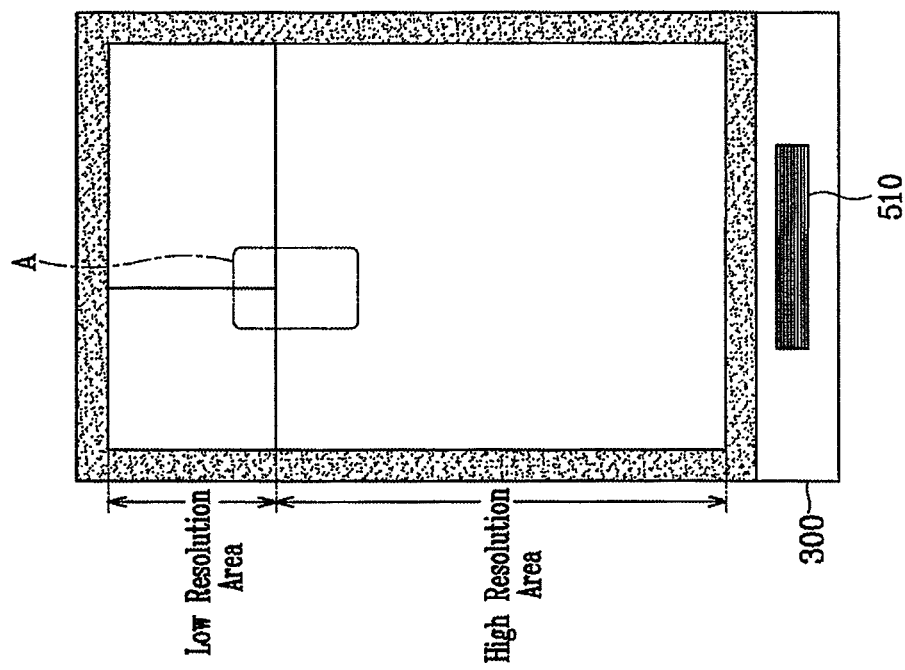

THIN FILM TRANSISTOR PANEL AND LIQUID CRYSTAL DISPLAY USING THE SAME

CROSS-REFERENCE TO RELATED APPLICATION

This application is a Continuation Application of U.S. patent application Ser. No. 11/302,968 filed Dec. 14, 2005, which claims benefit to Korean Patent Application Nos. 10-2004-0105548 filed on Dec. 14, 2004, Application No.: 10-2004-0109641 filed Dec. 21, 2004, Application No.: 10-2004-0115067 filed on Dec. 29, 2004 and Application No.: 2004-0117256 filed on Dec. 20, 3004, the contents of which are herein incorporated by reference in their entireties.

BACKGROUND OF THE INVENTION (a) Technical Field

The present disclosure relates to a liquid crystal display (LCD) and a thin film transistor (TFT) panel for the same.

(b) Discussion of the Related Art

Generally, an LCD includes a pair of panels respectively having electrodes on their inner surfaces, and a dielectric anisotropy liquid crystal layer interposed between the panels. In the LCD, a variation of the voltage difference between the field generating electrodes, i.e., a variation in the strength of an electric field generated by the electrodes, changes the transmittance of the light passing through the liquid crystal layer, and thus desired images are obtained by controlling the voltage difference between the electrodes.

In the LCD, the light may be a natural light or an artificial light emitted from a light source employed in the LCD.

A backlight is a representative device for providing the artificial light in the LCD and utilizes, for example, light emitting diodes (LEDs) or fluorescent lamps, such as cold cathode fluorescent lamps (CCFLs) and external electrode fluorescent lamps (EEFLs), as the light source.

Power consumption by the backlight represents a large part of the total power consumption of the LCD. Accordingly, to reduce power consumption of the LCD, it is desirable to focus on raising power efficiency of the backlight or reducing use time thereof.

Batteries used as a power source in mobile technologies, such as, for example, portable phones, have limited power supply capacities. For this reason, efforts have been made to increase maximum use time of the mobile technologies by reducing the power consumption by LCDs employed in the mobile technologies.

SUMMARY OF THE INVENTION

Embodiments of the present invention provide a low power-consumption LCD, and an LCD having a display region capable of displaying images at all times, regardless of the operation state of a backlight employed in the LCD.

According to an embodiment of the present invention, a liquid crystal display (LCD) device includes a low-resolution area and a high-resolution area, wherein a pixel formed in the low resolution area is larger than a pixel formed in the high resolution area.

This LCD device may include a transmissive LCD panel assembly, a backlight assembly for supplying light to the LCD panel assembly, and a selective reflection film provided between the backlight assembly and the LCD panel assembly.

Preferably, the transmissive LCD panel assembly includes a thin film transistor (TFT) panel, a color filter panel that is opposed to the TFT panel with a predetermined interval therebetween, a liquid crystal layer interposed between the TFT panel and the color filter panel, and a first polarizer and a second polarizer that are respectively provided on outer surfaces of the TFT panel and the color filter panel.

The LCD device may further include a data driving chip mounted on the TFT panel, a first gate driving chip mounted on the TFT panel to operate the low-resolution area, and a second gate driving chip mounted on the TFT panel to operate the high-resolution area.

Alternatively, the LCD device may further include a data driving chip mounted on the TFT panel, a first gate driving circuit formed in the TFT panel to operate the low-resolution area, and a second gate driving circuit formed in the TFT panel to operate the high-resolution area.

Preferably, the TFT panel includes a plurality of first gate lines formed in the low-resolution area, a plurality of second gate lines formed in the high-resolution area, a plurality of first data lines intersected with the first gate lines and the second gate lines, the plurality of first data lines being insulated from the first and second gate lines, and a plurality of second data lines intersected with and insulated from the second gate lines, and not intersected with the first gate lines.

The first data lines and the second data lines may be alternately arranged one by one, and an interval between two adjacent first gate lines may be about two times larger than an interval between two adjacent second gate lines.

The LCD may further include a transflective LCD panel assembly and a backlight assembly for supplying light to the LCD panel assembly.

The transflective LCD panel assembly may include a TFT panel that includes a reflective electrode formed on a transparent electrode and having a transmissive window, a color filter panel that is opposed to the TFT panel with a predetermined interval therebetween, a liquid crystal layer interposed between the TFT panel and the color filter panel, and a first polarizer and a second polarizer that are respectively provided on outer surfaces of the TFT panel and the color filter panel.

The TFT panel may include a plurality of first gate lines formed in the low-resolution area, a plurality of second gate lines formed in the high-resolution area, a plurality of first data lines that are intersected with and insulated from the first gate lines and the second gate lines, and a plurality of second data lines that are intersected with and insulated from the second gate lines, and not intersected with the first gate lines.

According to another embodiment of the present invention, there is provided a liquid crystal display (LCD) device comprising a low-resolution area and a high-resolution area, wherein a pixel formed in the low-resolution area is larger than a pixel formed in the high-resolution area, and at least a part of the low-resolution area exhibits only one color.

Preferably, a pixel formed in the low-resolution area is about three times as large as a pixel formed in the high-resolution area.

Preferably, a matrix of pixels formed in the low-resolution area corresponds to a matrix of pixel groups formed in the high-resolution area, each pixel group consisting of R, G, and B pixels represented as a dot in the high-resolution area.

Preferably, the data lines for supplying image signals to green pixels of the high-resolution area extend up to the low-resolution area so that all pixels formed in the low-resolution area may receive the image signals.

The low-resolution area may exhibit white and black, and a plurality of monochrome areas, each exhibiting only one color, may be included in the low-resolution area. Each monochrome area may exhibit a different color from the other areas. Further, at least one among the monochrome areas may be comprised of pixels, each having two kinds of color filters.

According to another embodiment of the present invention, there is provided a liquid crystal display (LCD) device comprising a low-resolution area and a high-resolution area, wherein the low-resolution area includes a plurality of first gate lines and a plurality of first data lines, and the high-resolution area includes a plurality of second gate lines and a plurality of second data lines, wherein a pixel formed in the low-resolution area is larger than a pixel formed in the high-resolution area, and wherein each of the first data lines extends in a length direction of the low-resolution area.

Preferably, the second data lines extend to be perpendicular to the first data lines.

This LCD device may further include a first gate driving circuit provided at a lateral side of the low-resolution area and extending in the length direction of the low-resolution area, the first gate driving circuit supplying scanning signals to the first gate lines.

The LCD device may further include a second gate driving circuit provided at a lateral side of the high-resolution area and extending in the same direction as the second data lines, the second gate driving circuit supplying scanning signals to the second gate lines.

Further, the LCD device may include a data driving circuit for supplying image signals to the first data lines and the second data lines and a wire for connecting the data driving circuit to the first data lines.

According to another embodiment of the present invention, there is provided a liquid crystal display (LCD) device comprising a display part that is divided into a plurality of display regions, a plurality of light source parts each including a light source for supplying light to a corresponding display region, and a light source controller for controlling a supply of voltage to the light source parts to control operation of the light source parts in response to control signals applied from an exterior device.

Preferably, the display part is divided into the plurality of display regions on the basis of resolution.

The display part may include a main display part of higher resolution and a sub display part of lower resolution.

The plurality of the light source parts may include a main light source part for supplying light to the main display part and a sub light source part for supplying light to the sub display part. Preferably, the main light source part includes more light sources than the sub light source part.

The light sources of the main light source part may be arranged in series or in parallel. Further, the light sources of the main light source part and the sub light source part may be light emitting diodes.

The LCD device may further include a plurality of power supply parts for outputting a voltage necessary for the operation of the respective light source parts, wherein the light source controller outputs a control signal capable of driving the plurality of power supply parts.

The plurality of light source parts may be individually provided at a top and a bottom of the display part.

Alternatively, the plurality of light source parts may be individually provided to the left or right of the display part.

BRIEF DESCRIPTION OF THE DRAWINGS

Preferred embodiments of the present invention can be understood in more detail from the following descriptions taken in conjunction with the accompanying drawings, in which:

FIG. 11A is a layout view of an LC panel according to another embodiment of the present invention.

FIG. 11B is a view enlarging a portion A of FIG. 11A.

DETAILED DESCRIPTION OF THE PREFERRED EMBODIMENTS

Preferred embodiments of the present invention will be described more fully hereinafter with reference to the accompanying drawings. The present invention may, however, be embodied in different forms and should not be construed as being limited to the embodiments set forth herein.

Figure 1:
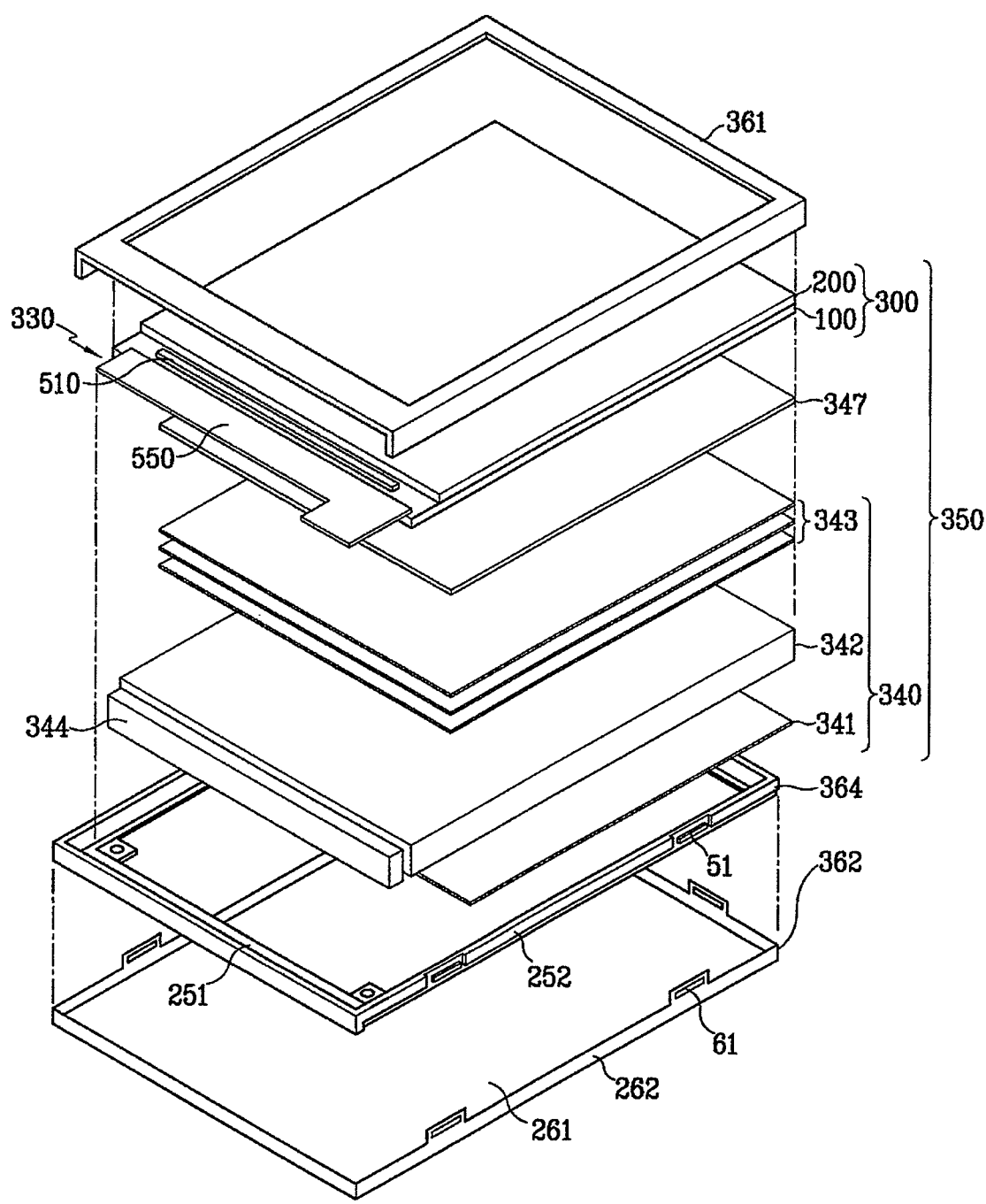
FIG. 1 is an exploded perspective view schematically illustrating an LCD according to an embodiment of the present invention.

FIG. 1 is an exploded perspective view schematically illustrating an LCD according to an embodiment of the present invention.

Referring to FIG. 1, an LCD according to an embodiment of the present invention includes an LC panel assembly 330 for displaying images using light, a backlight assembly 340 for producing light, a selective reflection film 347 provided between the LC panel assembly 330 and the backlight assembly 340, a mold frame 364 for receiving the LC panel assembly 330, the selective reflection film 347, and the backlight assembly 340 therein, and an upper chassis 361 and a lower chassis 362 that surround and support the above-mentioned elements.

The LC panel assembly 330 includes an LC panel 300 for exhibiting images, a driving chip 510, and a malleable circuit board 550.

The LC panel 300 includes a thin film transistor (TFT) panel 100 and a color filter panel 200 facing each other, and an LC layer (not shown) interposed therebetween.

The TFT panel is provided with a plurality of pixels (not shown) arranged substantially in a matrix. The pixels are defined by intersecting a plurality of gate lines (not shown) extending in a row direction while being parallel to each other, with a plurality of data lines (not shown) extending in a column direction while being parallel to each other. Each pixel is provided with a pixel electrode and a TFT (not shown) connected to a gate line, a data line, and a pixel electrode.

The color filter panel 200 is provided with a plurality of red, green, and blue (RGB) filters (not shown) capable of displaying desired colors using white light and produced by thin film processes. The color filter panel 200 also includes a common electrode opposite to the pixel electrodes of the TFT panel 100.

The voltages applied to the pixel electrodes and the common electrode align LC molecules in the LC layer, and the polarization of the light supplied from the backlight assembly 340 is varied according to the orientations of the LC molecules.

The driving chip 510 is mounted on a first edge of the TFT panel 100 to supply driving signals to the data lines and the gate lines. The driving chip 510 may include more than one chip, separately used for the gate lines and the data lines, or only one chip supplying the driving signals to both the data and gate lines. When the driving chip 510 is mounted on the TFT panel 100, a chip on glass (COG) technique is used.

The malleable circuit board 550 is attached to a first end of the TFT panel 100 in order to apply control signals to the driving chip 510. The malleable circuit board 550 includes a timing controller for controlling timing of the driving signals or a memory for storing the data signals. The malleable circuit board 550 is electrically connected to the TFT panel 100, with an anisotropy conductive film interposed therebetween.

The backlight assembly 340 is provided under the LC panel assembly 330 to supply a uniform light thereto.

The backlight assembly 340 includes a light source 344 for producing light, a light guiding plate 342 for guiding a proceeding path of light, optical sheets 343 for dispersing the incident light from the light guiding plate 342 uniformly, and a reflection plate 341 for reflecting light leaked from the light guiding plate 342.

The light source 344 is placed on a side of the light guiding plate 342 to emit light toward the light guiding plate 342. Such a light source 344 may utilize a linear light source, such as, for example, cathode fluorescent lamps (CCFLs) and external electrode fluorescent lamps (EEFLs), as well as light emitting diodes (LEDs), of which power consumption is relatively low. Another malleable circuit board (not shown) is attached to a side of the light source 344 to control it. In this embodiment, the light source 344 is provided on only one side of the light guiding plate 342 as mentioned above. Alternatively, the light source 344 may be provided on both sides of the light guiding plate 342. In addition, a plurality of light sources may be provided under the light guiding plate 342. In such a case, the light guiding plate 342 may be omitted.

The light guiding plate 342 has a light guiding pattern (not shown) capable of directing the light toward a display region of the LC panel 300.

The optical sheets 343 are provided between the light guiding plate 342 and the LC panel 300. The optical sheets 343 disperse the incident light from the light guiding plate 342 uniformly and then supply the uniformly dispersed light to the LC panel 300.

Meanwhile, the selective reflection film 347 is provided between the LC panel assembly 330 and the backlight assembly 340. This reflection film 347 reflects the ambient light toward the LC panel 300 when the light source 344 is turned off, in order for the images to be displayed on the display region in the case when the light source 344 is off. This is possible because the reflection film 347 is designed to transmit and reflect light, selectively. That is, when the light source 344 is turned on, the reflection film 347 transmits the incident light from the backlight assembly 340 and supplies it to the LC panel 300. Conversely, when the light source 344 is turned off, the reflection film 347 reflects the ambient light entering through the LC panel 300, toward the LC panel 300, in order for the images to be displayed on the display region.

The reflection plate 341 is provided under the light guiding plate 342. The light leaked from the light guiding plate 342 is reflected by this reflection plate 341 and returned toward the light guiding plate 342, thereby improving light efficiency.

The mold frame 364 receives, in order, the reflection plate 341, the light guiding plate 342, the optical sheets 343, and the LC panel 300. The mold frame 364, including resin plastics, is provided with an open bottom 251 and sidewalls 252 extending from the bottom 251.

The malleable circuit board 550 is curved along an outer portion of the sidewalls 252 of the mold frame 364. A plurality of first protrusions 51 are formed on the outer portion of the sidewalls 252 of the mold frame 364, which are combined with the lower chassis 362.

The lower chassis 362, including a metallic material, defines a space for accommodating the mold frame 364 therein. The lower chassis 362 includes a bottom 261 and sidewalls 262 extending upward from the bottom 261. A plurality of grooves 61 are formed on the sidewalls 262 of the lower chassis 362, which are combined with the protrusions 51 of the mold frame 364.

When the mold frame 364 is combined with the lower chassis 362, part of the sidewalls 262 of the lower chassis 362 are placed on the outer portion of the sidewalls 252 of the mold frame 364, and each of the first protrusions 51 is inserted through the respective grooves 61 of the lower chassis 362. At this time, it is preferable to form portions of the mold frame 364 that contact the sidewalls 262 of the lower chassis 362, such that the mold frame is depressed by an amount equal to about a thickness of the sidewalls 262.

The upper chassis 361 is provided above the LC panel 300. When the upper chassis 361 is assembled with the lower chassis 362, an effective display region of the LC panel 300 where the image display is realized is kept in an open state. The upper chassis 361 guides a position of the LC panel 300 and then fixes the LC panel in the mold frame 364.

The LC panel 300 according to an embodiment of the present invention will be described with reference to FIGS. 2A and 2B, and FIG. 3.

Figure 2A:
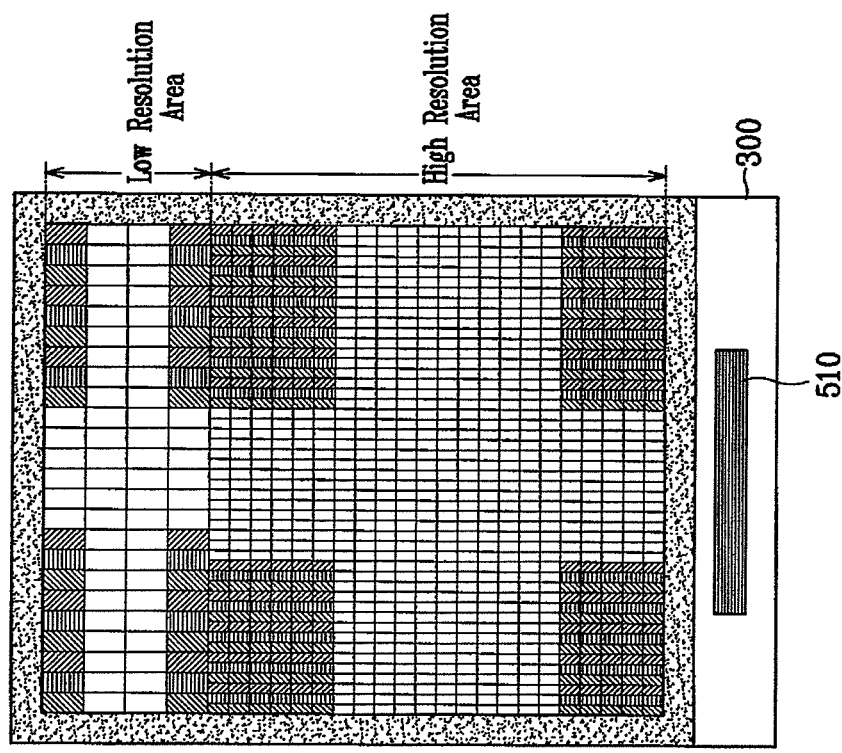
FIG. 2A is a layout view of an LCD according to an embodiment of the present invention.
Figure 2B:
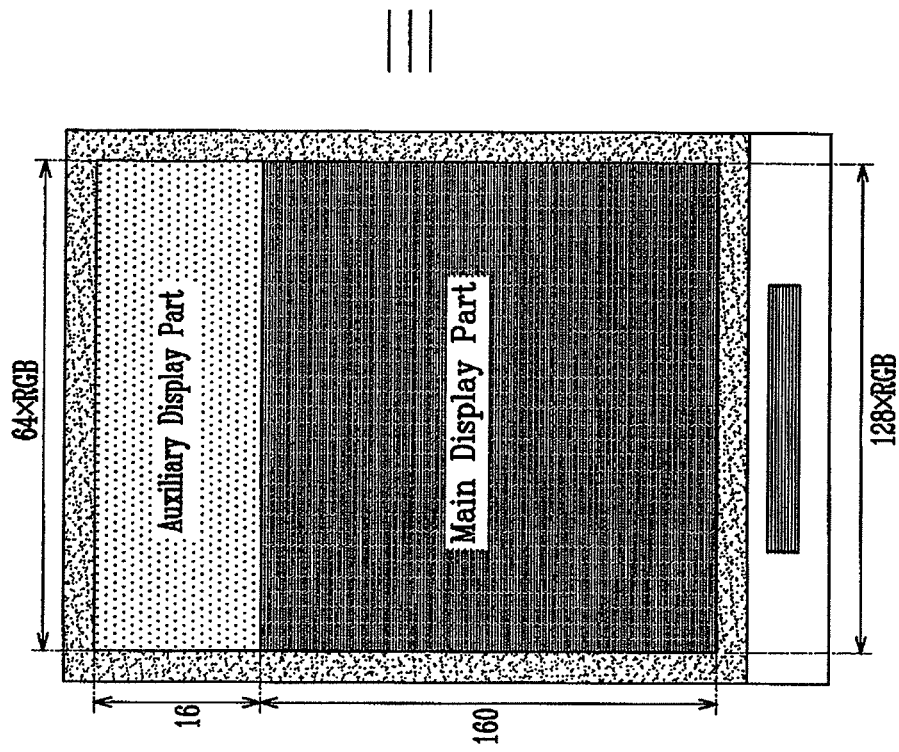
FIG. 2B is a view showing pixels arranged in the LCD of FIG. 2A.

FIG. 2A is a layout view of an LCD according to an embodiment of the present invention and FIG. 2B is a view showing pixels arranged in the LCD of FIG. 2A. FIG. 3 shows two views for comparing a pixel unit formed in a low-resolution area with a pixel unit formed in a high-resolution area of the LCD shown in FIG. 2B.

Referring to FIG. 2A and FIG. 2B, a driving chip 510 is mounted under an LC panel 300, and a display region of the LC panel 300 is divided into a low-resolution area and a high-resolution area.

Each pixel formed in the low-resolution area is four times as large as a pixel formed in the high-resolution area. The low-resolution area is used as an auxiliary display part for displaying fixed patterns, such as time, antenna sensitivity, the remaining battery capacity or the like, in, for example, mobile technologies.

The high-resolution area is used as a main display part for displaying various and detailed images.

Figure 3:
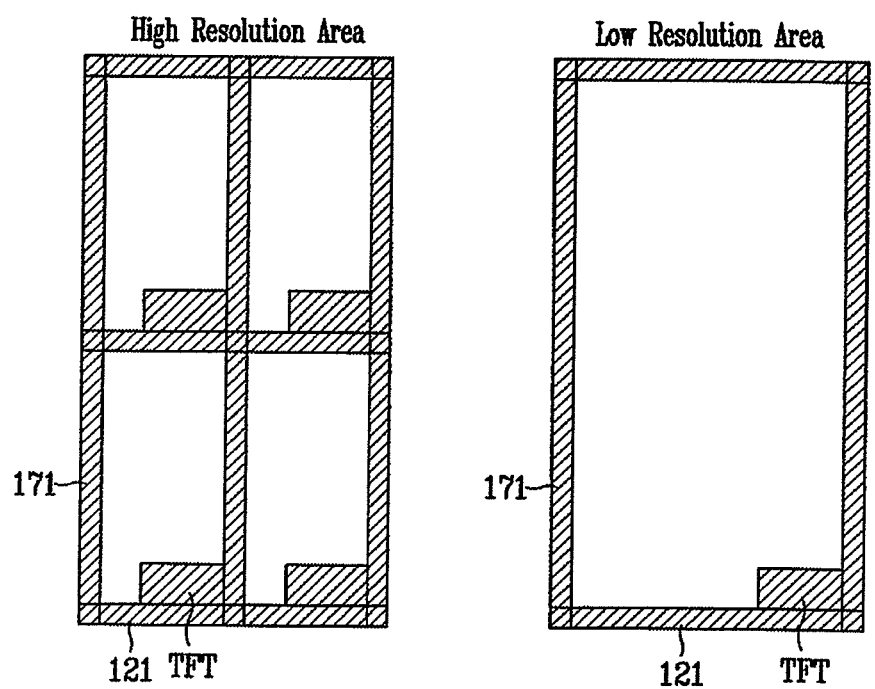
FIG. 3 shows two views for comparing a pixel unit formed in a low-resolution area with a pixel unit formed in a high-resolution area of the LCD shown in FIG. 2B.

Referring to FIG. 3, the pixel unit of the low-resolution area is four times as large as the pixel unit of the high resolution area, but the size of wires, such as gate lines 121 and data lines 171, and TFTs are the same in the two areas. Accordingly, an aperture ratio of the low-resolution area is higher than that of the high-resolution area. For example, a 1.8-inch LCD panel having a resolution of 128×160 exhibits an aperture ratio of about 53%. When, like the low resolution area, the pixel size increases four times as large as that of the 1.8-inch LCD panel having the resolution of 128×160, the aperture ratio increases to about 76%. That is, the aperture ratio in the lower-resolution area is increased by about 43% compared to that in the higher-resolution area.

Although the light reflected by the selective reflection film 347 is exclusively used for the image display when the light source 344 of FIG. 1 is turned off, good quality image display can be realized due to the increased aperture ratio.

If a selective reflection film 347 was used in conventional LCDs, it would be difficult to represent the desired images accurately when the light source 344 was turned off, since light efficiency in that case is too low. Whereas, when each pixel formed in an image display area has a large dimension, as in an embodiment of the present invention, good quality image display becomes possible using only the selective reflection film 347 when the light source 344 is turned off in order to reduce the power consumption.

For example, in LCDs employed in mobile units, the backlights are turned on only when the mobile units are used to reduce power consumption. However, information about time or remaining power, for example, should be continuously displayed in order to confirm them at any time. For this reason, a proposed technique is to divide the display region of the LC panel into a low-resolution area and a high-resolution area. In this case, the low-resolution area displays information that should be displayed all the time, while the high-resolution area displays other information connected with the actual use of the mobile unit. Such an LCD allows some primary information to be displayed even when the light source is turned off in order to save power.

In this embodiment, each pixel formed in the low-resolution area is configured to have a dimension corresponding to a 2×2 matrix, namely, four times the size of a pixel formed in the high resolution area, but such a dimension may be altered as necessary.

Hereinafter, the structure of the LC panel 300 (shown in FIG. 1) will be described in more detail. The pixels of the high-resolution area and the low-resolution area have the same structure, except for their dimensions.

Figure 4:
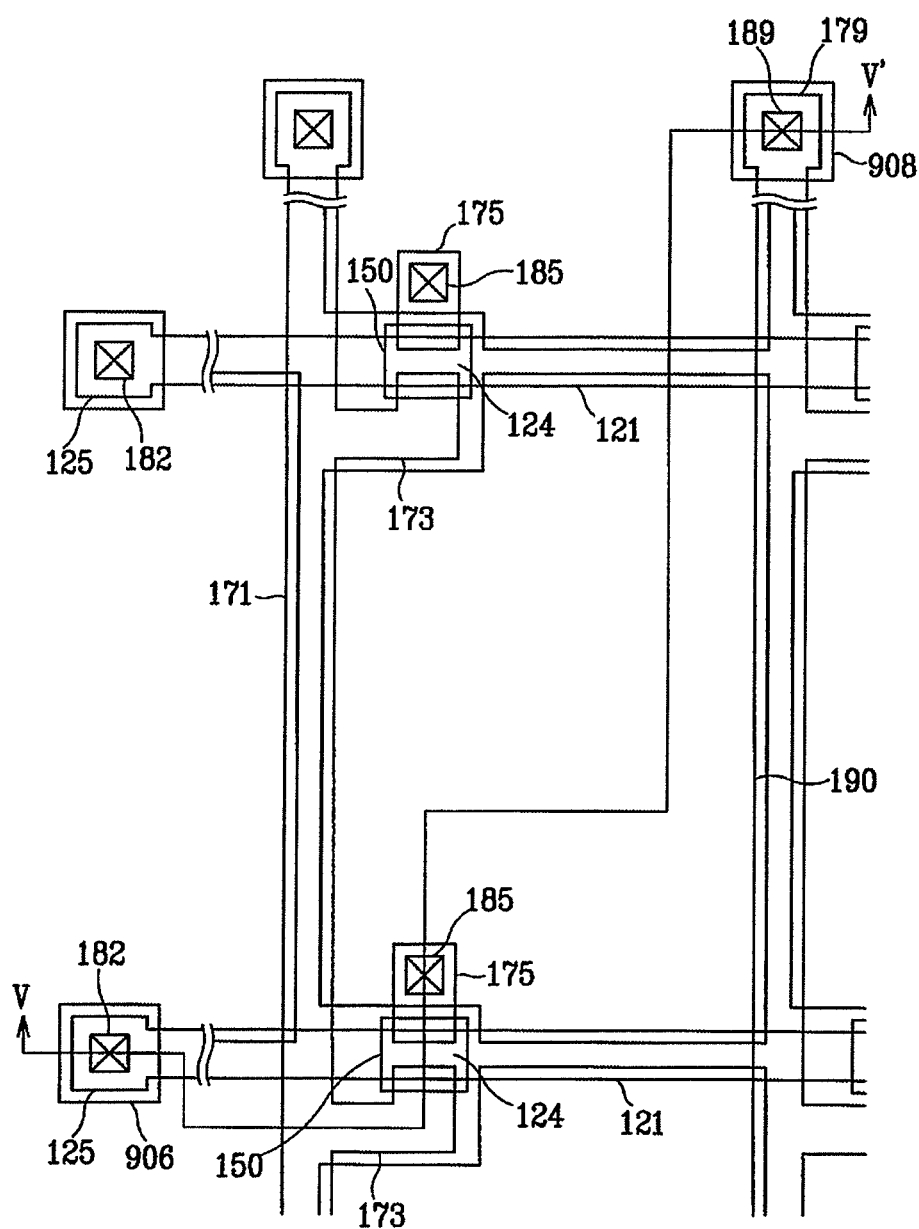
FIG. 4 is a layout view of a pixel unit in an LC panel of an LCD according to an embodiment of the present invention.
Figure 5:
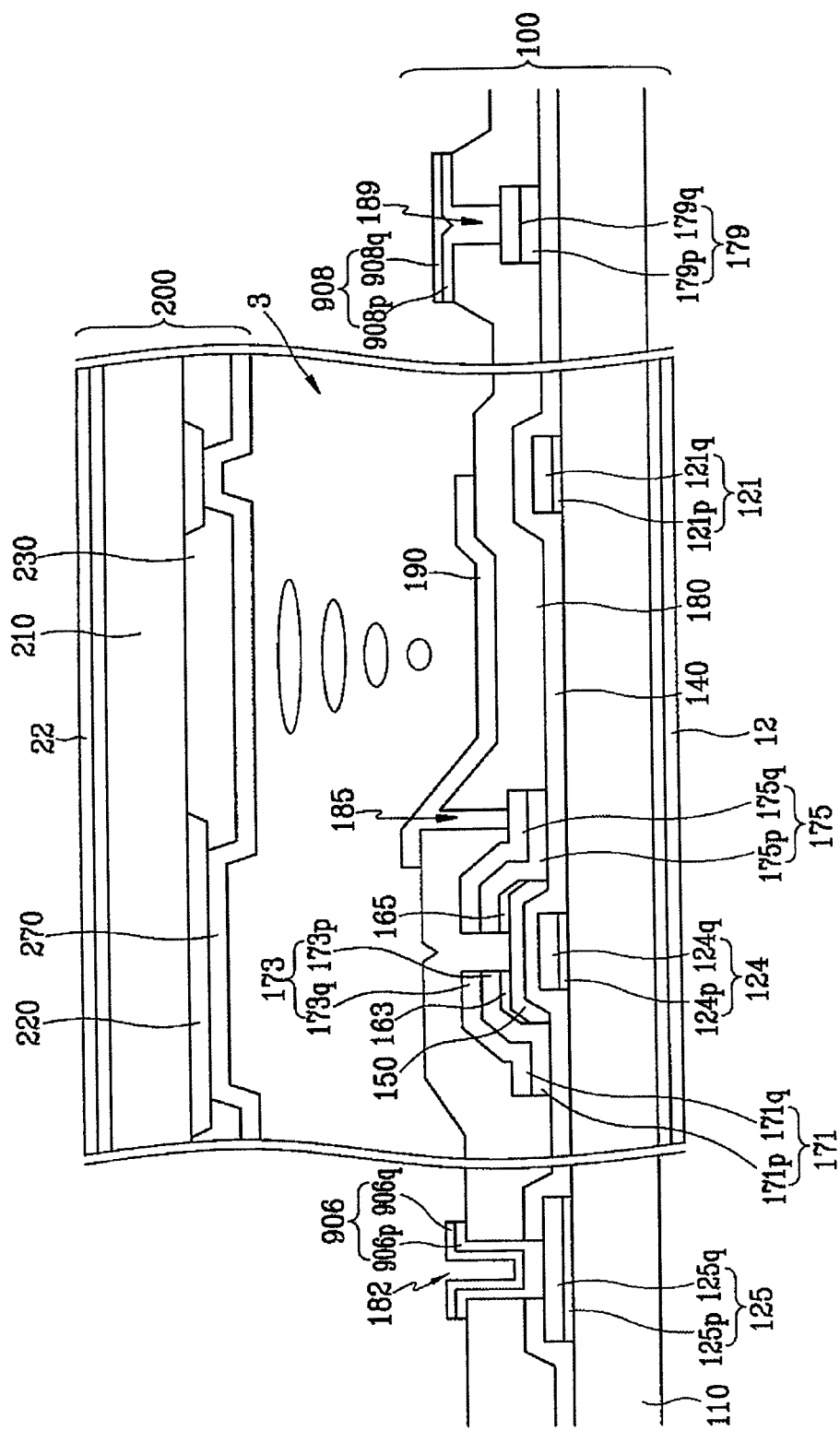
FIG. 5 is a cross-sectional view cut along the line V-V' of FIG. 4.

FIG. 4 is a layout view of a pixel unit in an LC panel of an LCD according to an embodiment of the present invention and FIG. 5 is a cross-sectional view cut along V-V' of FIG. 4.

The TFT panel 100 is configured as below.

A plurality of gate lines 121 are formed on an insulating substrate 110 and transmit gate signals. Each gate line 121 extends substantially in a horizontal direction, and includes a plurality of gate electrodes 124, and an end portion 125 having a relatively large dimension to be connected to an external device. The gate lines 121 are disposed on the display region except for the end portions 125 thereof, which are positioned around the display region. In the case that a gate driving circuit is directly integrated into the TFT panel 100, the enlarged end portions 125 may be omitted.

The gate lines 121 include two layers having different physical properties, i.e., an upper layer 121q and a lower layer 121p. The upper layer 121q comprises a low resistivity metal, for example, an aluminum (Al) containing metal, such as Al and Al alloy, in order to reduce delay of gate signals and voltage drop. The lower layer 121p comprises a material having prominent physical, chemical, and electrical contact properties with other materials, particularly indium tin oxide (ITO) and indium zinc oxide (IZO). For example, Mo, Mo alloy (for example, MoW), Cr, Ta, or Ti, may be used for the formation of the lower layer 121p. A preferred example of the combination of the two layers is a lower Cr layer and an upper AlNd layer. In FIG. 5, a lower layer and an upper layer of the gate electrode 124 are individually represented as 124p and 124q. Further, each end portion 125 of the gate lines 121 includes two layers, a lower layer 125p and an upper layer 125q.

The sides of the lower layer 121p and the upper layer 121q slope by about 30° to about 80° with respect to the surface of the substrate 110.

A gate insulating layer 140 comprising, for example, nitride silicon (SiNx), is formed on the gate lines 121.

A plurality of semiconductors 150 comprising, for example, hydrogenated amorphous silicon, abbreviated as "a-Si", are formed on the gate insulating layer 140. Each semiconductor 150 is formed substantially on the gate electrode 124, covering a wide region including the gate electrode 124.

A plurality of island-shaped ohmic contacts 163 and 165 are individually formed on the semiconductors 150, and comprise, for example, silicide or N+ hydrogenated amorphous silicon, highly doped with N-type impurities. A set of the island-shaped ohmic contacts 163 and 165 are placed on the semiconductors 150.

The sides of the semiconductors 150 and the ohmic contacts 163 and 165 slope by about 30° to about 80° with respect to the surface of the substrate 110.

A plurality of data lines 171 and a plurality of drain electrodes 175 are formed on the ohmic contacts 163 and 165 and the gate insulating layer 140.

The data lines 171 extend substantially in a vertical direction to be crossed with the gate lines 121 and transmit data voltage. Each data line 171 includes an end portion 179 having a relatively large dimension to be connected to an external device. The data lines 171 are disposed on the display region except for the end portions 179 thereof, which are positioned around the display region.

Each data line 171 includes a plurality of source electrodes 173 protruding therefrom and corresponding to respective drain electrodes 175, and each having the shape of a branch. A set of the drain electrodes 175 and the source electrodes 173 are separated from each other and face each other. The gate electrode 124, the source electrode 173, the drain electrode 175, and the semiconductor 150 form a TFT, and a TFT channel is formed at the semiconductor 150 provided between the source electrode 173 and the drain electrode 175.

Each data line 171 and each drain electrode 175 also have the double-layered structure. Lower layers 171p and 175p comprise, for example, Mo, Cr, Ta, Ti or alloys thereof, and upper layers 171q and 175q comprise, for example, a metallic material such as an Al containing metal or an Ag containing metal. Each end portion 179 of the data lines 171 has an upper layer 179q and a lower layer 179p.

Similar to the gate lines 121, the sides of the lower layers 171p and 175p and the upper layers 171q and 175q of the data lines 171 and the drain electrodes 175 also slope by about 30° to about 80° with respect to the surface of the substrate 110.

The ohmic contacts 163 and 165 are interposed between the underlying semiconductors 150 and the overlying data lines 171 and between the underlying semiconductors 150 and the overlying drain electrodes 175, in order to reduce contact resistance therebetween.

A passivation layer 180 is formed on the data lines 171, the drain electrodes 175, and the exposed areas of the semiconductors 151. The passivation layer 180 preferably comprises a photosensitive organic material having prominent planarization properties, an insulating material having a relatively low dielectric constant of below 4.0, such as, for example, a-Si:C:O or a-Si:O:F, which are produced by plasma enhanced chemical vapor deposition (PECVD), or an inorganic material such as, for example, $SiN_2$.

The passivation layer 180 has a plurality of contact holes 185 and 189, through which the end portions 179 of the data lines 171 and drain electrodes 175 are exposed, respectively. A plurality of contact holes 182 are formed to penetrate the passivation layer 180 and the gate insulating layer 140, through which the enlarged end portions 125 of the gate lines 121 are exposed.

A plurality of pixel electrodes 190 and a plurality of contact assistants 906 and 908, comprising a transparent conductive material such as, for example, ITO or IZO, are formed on the passivation layer 180.

The pixel electrodes 190 are physically and electrically connected to the drain electrodes 175 through the contact holes 185 to receive data voltages from the drain electrodes 175.

The pixel electrodes 190 are overlapped with the adjacent gate line 121 and the adjacent data line 171 to increase the aperture ratio, but they are not overlapped with each other.

The contact assistants 906 and 908 are individually connected to the end portions 125 of the gate lines 121 and the end portions 179 of the data lines 171 through the contact holes 182 and 189. The contact assistants 906 and 908 supplement adhesion between the enlarged end portions 125 and 179 and the exterior devices, and protect the end portions 125 and 179. The contact assistants may be omitted in some cases.

The color filter panel 200 is configured as below, as shown in FIG. 5.

A black matrix 220 is formed on an insulating substrate 210, and a plurality of color filters 230 are formed thereon. The respective color filters 230 are provided at each pixel unit and are defined by the black matrix 220. Red, green, and blue (RGB) color filters are used. A region having no color filter may be formed on the color filter panel 200 or white color filters made of transparent resin may be additionally used.

A common electrode 270 comprising a transparent conductive material such as, for example, ITO or IZO, is formed on the color filters 230.

A liquid crystal layer 3 is interposed between the TFT panel 100 and the color filter panel 200, and includes twisted nematic liquid crystal molecules.

This embodiment uses the twisted aligned liquid crystal molecules. However, it is also possible to use the liquid crystal molecules aligned vertically or parallel with respect to the two panels 100 and 200, while being parallel to each other.

A lower polarizer 12 and an upper polarizer 22 are respectively provided on the outer surfaces of the two panels 100 and 200.

In the LCD according to the present embodiment, when a common voltage is applied to the common electrode 270 of the color filter panel 200 while an image signal voltage is applied to the pixel electrode 190 through the data line 171, an electric field is generated between the two electrodes, so that the orientations of the liquid crystal molecules interposed between the two electrodes are varied.

Also, a set of the pixel electrode 190 and the common electrode 270 serves as a capacitor capable of storing the applied voltage even after the TFT is turned off. This capacitor is referred to as a "liquid crystal capacitor". To enhance the voltage storage ability, a "storage capacitor" may be further provided, which is connected to the liquid crystal capacitor in parallel. To form such a storage capacitor, storage electrode lines (not shown) may be formed on the same layer as the gate lines 121.

In the embodiments according to the present invention, the display region in the LC panel 300 is divided into a high-resolution area and a low-resolution area as mentioned above. A method for driving the two areas will be described below.

Figure 6:
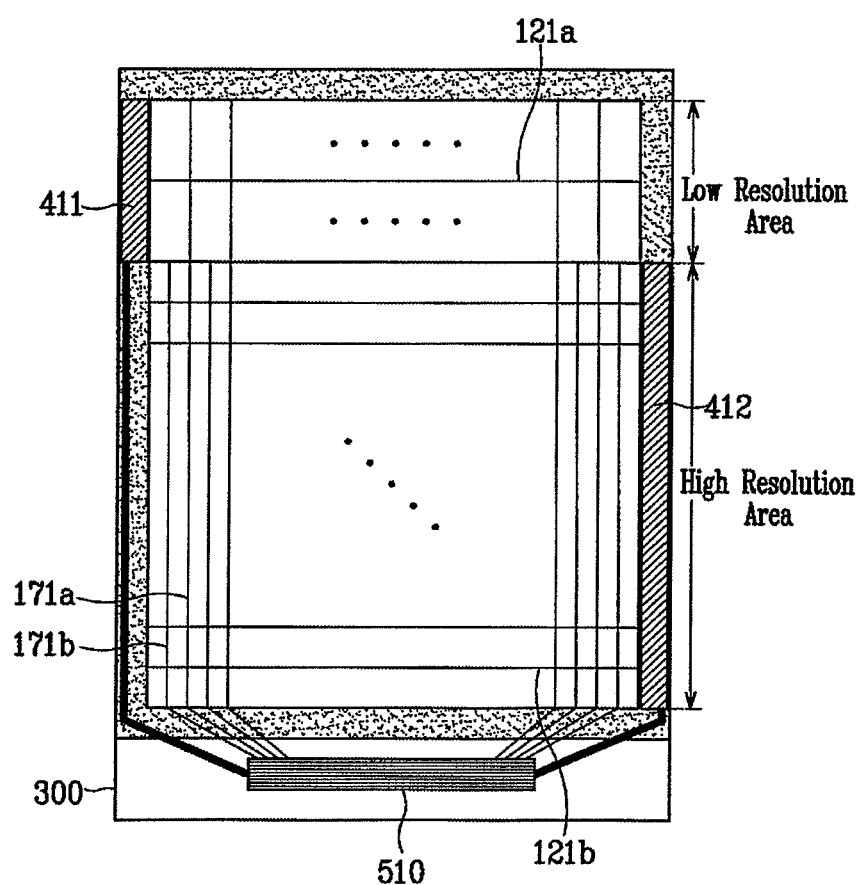
FIG. 6 is a layout view of a driving circuit of an LCD according to an embodiment of the present invention.
Figure 7:
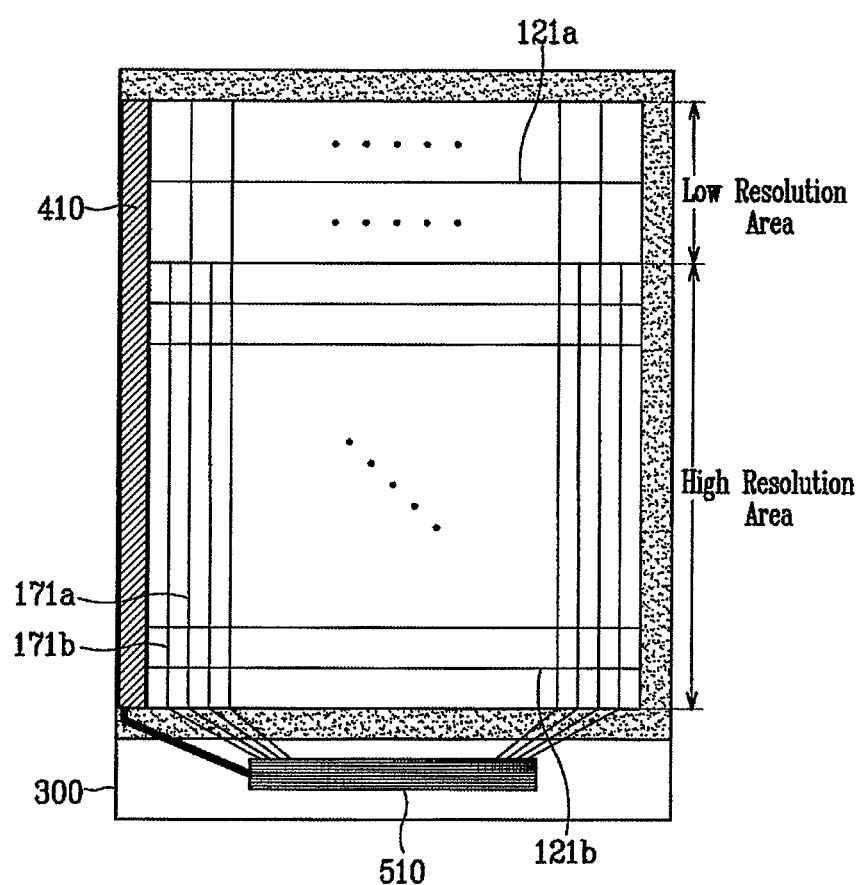
FIG. 7 is a layout view of a driving circuit of an LCD according to another embodiment of the present invention.

FIG. 6 is a layout view of a driving circuit of an LCD according to an embodiment of the present invention and FIG. 7 is a layout view of a driving circuit of an LCD according to another embodiment of the present invention.

First, referring to FIG. 6, a driving chip 510 is mounted on an LC panel 300, a gate driver 411 for driving the low-resolution area is provided at the left of the low-resolution area, and a gate driver 412 for driving the high-resolution area is provided at the right of the high-resolution area. Here, the gate drivers 411 and 412 may be mounted on the corresponding areas of a TFT panel 100 in the shape of chips, or may be directly integrated into the corresponding areas.

The TFT panel 100 includes gate lines 121a of the low-resolution area and 121b of the high-resolution area. Data lines 171a (e.g., even lines) are insulated from, and intersected with, all of the gate lines 121a and 121b, while data lines 171b (e.g., odd lines) are insulated from, and intersected with, only the gate lines 121b of the high-resolution area. In this structure, an interval between two adjacent gate lines 121a formed in the low-resolution area is twice as large as an interval between two adjacent gate lines 121*b* formed in the high-resolution area.

In such a configured LCD according to an embodiment of the present invention, in order to display images only at the low-resolution area, driving signals may be applied only to the gate driver 411 of the low-resolution area, and not to the gate driver 412 of the high-resolution area. As a result, the data lines 171 supply necessary image signals only to the data lines 171*a* that traverse the two resolution areas.

Next, referring to FIG. 7, a gate driver 410 is provided at the left of the low-resolution area and the high-resolution area, traversing the two areas. Here, the gate driver 410 may be mounted on a TFT panel 100 in the shape of a chip, or may be directly integrated into the TFT panel 100.

In such a configured LCD according to an embodiment of the present invention, when the high-resolution area receives only gate-off signals continuously while the low-resolution area receives gate-on and -off signals, image display is realized only at the low-resolution area. In this case, the data lines 171 supply necessary image signals only to the data lines 171*a* that traverse the two resolution areas.

According to the above-described embodiments, no driving signal or only the gate-off signals are applied to the high-resolution area, in order to display the images only at the low resolution area. However, it is also possible to apply the gate-on and -off signals to the high-resolution area.

The embodiments of the present invention are applicable to transflective type LCDs.

A transflective LCD applying the embodiments of the present invention has the same structure as FIG. 1, except that the selective reflection film 347 is eliminated.

Similar to FIG. 2A through FIG. 3, an LCD panel 300 of the transflective LCD is also divided into a low-resolution area and a high-resolution area, and each pixel unit of the low-resolution area is larger than that of the high-resolution area.

The transflective LCD applying the embodiments of the present invention will be described with reference to FIG. 8 and FIG. 9.

Figure 8:
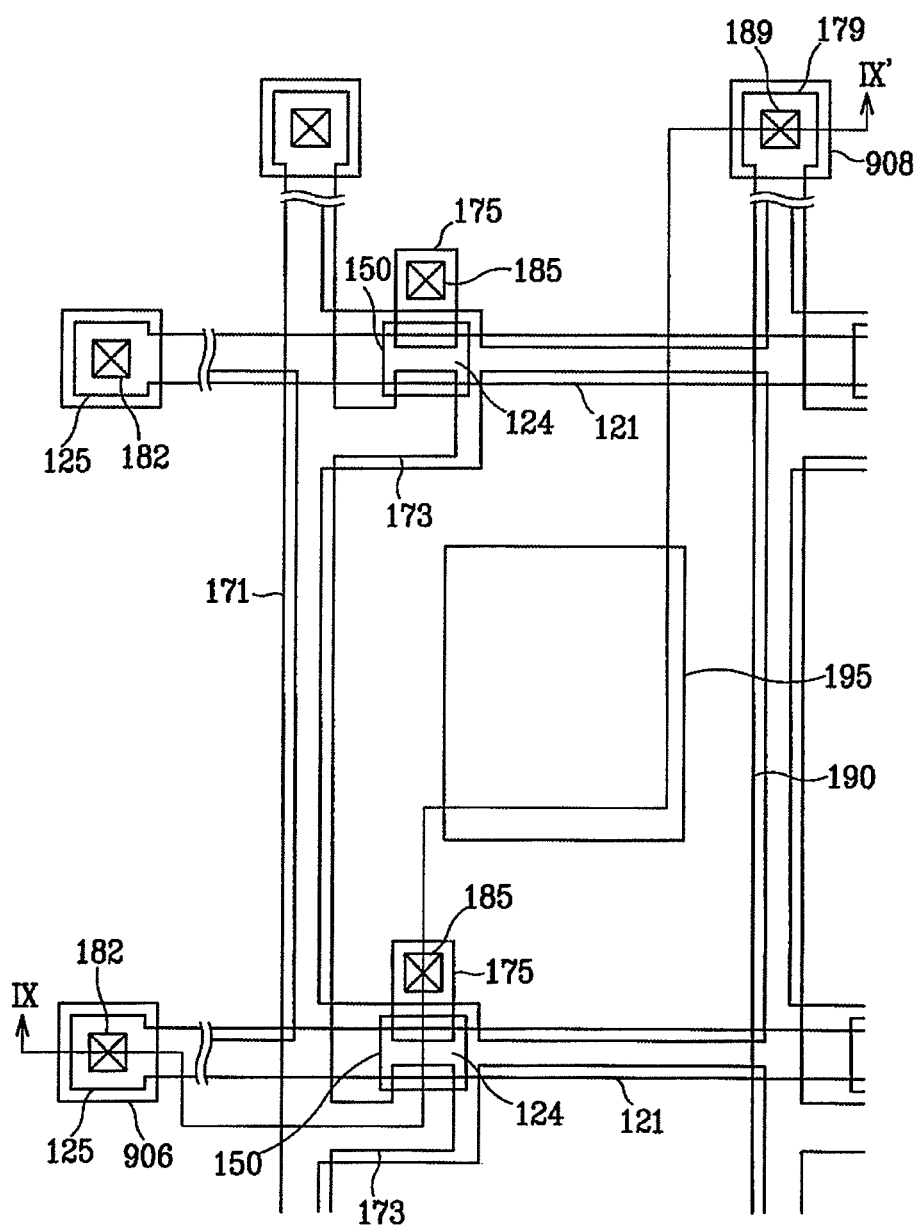
FIG. 8 is a layout view of a pixel unit formed in an LC panel of an LCD according to another embodiment of the present invention.
Figure 9:
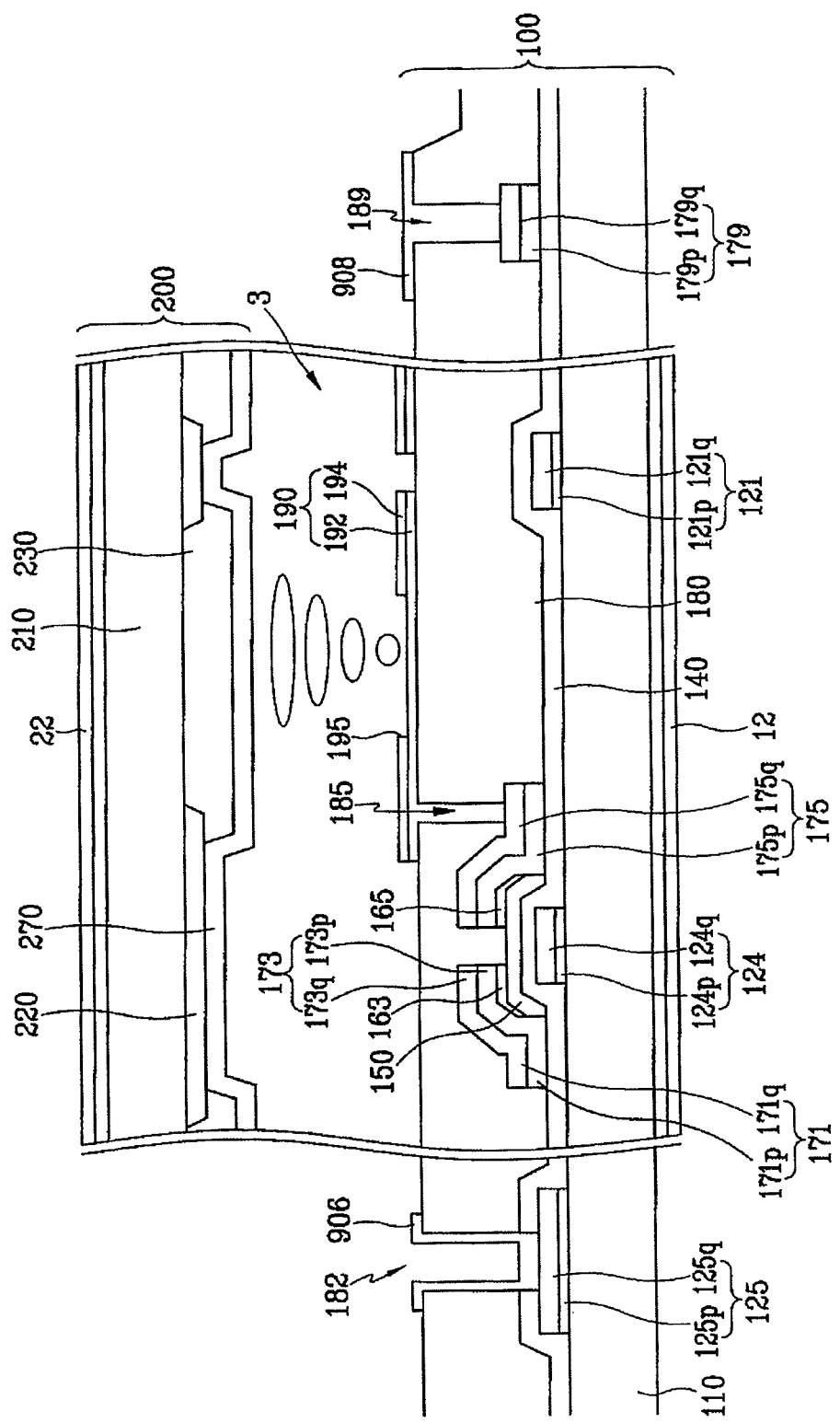
FIG. 9 is a cross-sectional view cut along the line IX-IX' of FIG. 8.

FIG. 8 is a layout view of a pixel unit formed in an LC panel of an LCD according to another embodiment of the present invention and FIG. 9 is a cross-sectional view cut along IX-IX' of FIG. 8.

A TFT panel 100 according to the present embodiment is configured as below.

A plurality of gate lines 121 are formed on an insulating substrate 110 and transmit gate signals. Each gate line 121 extends substantially in a horizontal direction, and includes a plurality of gate electrodes 124, and an end portion 125 having a relatively large dimension to be connected to an external device. The gate lines 121 are disposed on the display region except for the end portions 125 thereof, which are positioned around the display region. In the case that a gate driving circuit is directly integrated into the TFT panel 100, the enlarged end portions 125 may be omitted.

The gate lines 121 include two layers having different physical properties, i.e., an upper layer 121*q* and a lower layer 121*p*. The upper layer 121*q* comprises a low resistivity metal, for example, an aluminum (Al) containing metal, such as Al and Al alloy, in order to reduce a delay of the gate signals and a voltage drop. The lower layer 121*p* comprises a material having prominent physical, chemical, and electrical contact properties with other materials, particularly indium tin oxide (ITO) and indium zinc oxide (IZO). For example, Mo, Mo alloy (for example: MoW), Cr, Ta, or Ti, may be used for the formation of the lower layer 121*p*. A preferred example of the combination of the two layers is a lower Cr layer and an upper AlNd layer. In FIG. 9, a lower layer and an upper layer of the gate electrode 124 are individually represented as 124*p* and 124*q*. Further, each end portion 125 of the gate lines 121 includes two layers, a lower layer 125*p* and an upper layer 125*q*.

The sides of the lower layer 121*p* and the upper layer 121*q* slope by about 30° to about 80° with respect to the surface of the substrate 110.

A gate insulating layer 140 comprising, for example, nitride silicon (SiNx), is formed on the gate lines 121.

A plurality of semiconductors 150 comprising, for example, hydrogenated a-Si, are formed on the gate insulating layer 140. Each semiconductor 150 is formed substantially on the gate electrode 124, covering a wide region including the gate electrode 124.

A plurality of island-shaped ohmic contacts 163 and 165 are individually formed on the semiconductors 150, and comprise, for example, silicide or N+ hydrogenated a-Si, highly doped with N-type impurities. A set of the island-shaped ohmic contact 163 and 165 are placed on the semiconductor 150.

The sides of the semiconductors 150 and the ohmic contacts 163 and 165 slope by about 30° to about 80° with respect to the surface of the substrate 110.

A plurality of data lines 171 and a plurality of drain electrodes 175 are formed on the ohmic contacts 163 and 165 and the gate insulating layer 140.

The data lines 171 extend substantially in a vertical direction to be crossed with the gate lines 121 and transmit data voltage. Each data line 171 includes an end portion 179 having a relatively large dimension to be connected to an external device. The data lines 171 are disposed on the display region except for the end portions 179 thereof, which are positioned around the display region.

Each data line 171 includes a plurality of source electrodes 173 protruding therefrom and corresponding to respective drain electrodes 175, each having the shape of a branch. A set of the drain electrodes 175 and the source electrodes 173 are separated from each other and face each other. The gate electrode 124, the source electrode 173, the drain electrode 175, and the semiconductor 150 form a TFT, and a TFT channel is formed at the semiconductor 150 provided between the source electrode 173 and the drain electrode 175.

Each data line 171 and each drain electrode 175 also have the double-layered structure. Lower layers 171*p* and 175*p* comprise, for example, Mo, Cr, Ta, Ti or alloys thereof, and upper layers 171*q* and 175*q* comprise, for example, a metallic material such as an Al containing metal or an Ag containing metal. Each end portion 179 of the data lines 171 has an upper layer 179*q* and a lower layer 179*p*.

Similar to the gate lines 121, the sides of the lower layers 171*p* and 175*p* and the upper layers 171*q* and 175*q* of the data lines 171 and the drain electrodes 175 also slope by about 30° to about 80° with respect to the surface of the substrate 110.

The ohmic contacts 163 and 165 are interposed between the underlying semiconductors 150 and the overlying data lines 171 and between the underlying semiconductors 150 and the overlying drain electrodes 175, in order to reduce contact resistance therebetween.

A passivation layer 180 is formed on the data lines 171, the drain electrodes 175, and the exposed areas of the semiconductors 151. The passivation layer 180 preferably comprises a photosensitive organic material having prominent planarization properties, an insulating material having a relatively low dielectric constant of below about 4.0, such as, for example, a-Si:C:O or a-Si:O:F, which are produced by plasma enhanced chemical vapor deposition (PECVD), or an inorganic material such as, for example, $SiN_2$.

The passivation layer 180 has a plurality of contact holes 185 and 189, through which the end portions 179 of the data lines 171, and the drain electrodes 175 are exposed, respectively. A plurality of contact holes 182 are formed to penetrate the passivation layer 180 and the gate insulating layer 140, through which the enlarged end portions 125 of the gate lines 121 are exposed.

A plurality of transparent electrodes 192 and a plurality of contact assistants 906 and 908, comprising a transparent conductive material such as, for example, ITO or IZO, are formed on the passivation layer 180.

A plurality of reflective electrodes 194 are individually formed on the transparent electrodes 192, and comprise a conductive material having good reflection property, such as, for example, Ag. Each reflective electrode 194 has a transmission window 195, where light is freely transmitted.

A set of the transparent electrodes 192 and the reflective electrodes 194 may serve as a pixel electrode 190, and each reflective electrode 194 may serve as a reflective film for reflecting light.

The transparent electrodes 192 are physically and electrically connected to the drain electrodes 175 through the contact holes 185 to receive data voltages from the drain electrodes 175.

The contact assistants 906 and 908 are individually connected to the end portions 125 of the gate lines 121 and the end portions 179 of the data lines 171 through the contact holes 182 and 189. The contact assistants 906 and 908 are supplement adhesion between the enlarged end portions 125 and 179 and the exterior devices, and protect the end portions 125 and 179. The contact assistants may be omitted.

The color filter panel 200 is configured as below, as shown in FIG. 9.

A black matrix 220 is formed on an insulating substrate 210, and a plurality of color filters 230 are formed thereon. The respective color filters 230 are provided at each pixel unit and defined by the black matrix 220. Red, green, and blue (RGB) color filters are used. A region having no color filter may be formed on the color filter panel 200 or white color filters comprising transparent resin also may be used.

A common electrode 270 comprising a transparent conductive material such as, for example, ITO or IZO, is formed on the color filters 230.

A liquid crystal layer 3 is interposed between the TFT panel 100 and the color filter panel 200, and includes twisted nematic liquid crystal molecules.

This embodiment uses the twisted aligned liquid crystal molecules. However, it is also possible to use the liquid crystal molecules aligned vertically or parallel with respect to the two panels 100 and 200, while being parallel to each other.

A lower polarizer 12 and an upper polarizer 22 are individually provided on the outer surfaces of the two panels 100 and 200, respectively.

The transflective LCD may be used in the reflective mode, reflecting ambient light toward the LCD when the ambient light has a high brightness suitable for the image display. However, in the case where the ambient light has insufficient brightness, the reflective mode is converted to the transmissive mode, using the light emitted from the backlight for the image display.

When the backlight is turned off to save power in such a transflective LCD, the low-resolution area is operated in the reflective mode, so that necessary information of a fixed pattern can be displayed at all times, regardless of the operation of the backlight.

The driving circuit or the driving chip of the transflective LCD having the two different resolution areas may be arranged as shown FIG. 6 and FIG. 7, and a driving method thereof is equivalent to the previously illustrated method.

Figure 10B:
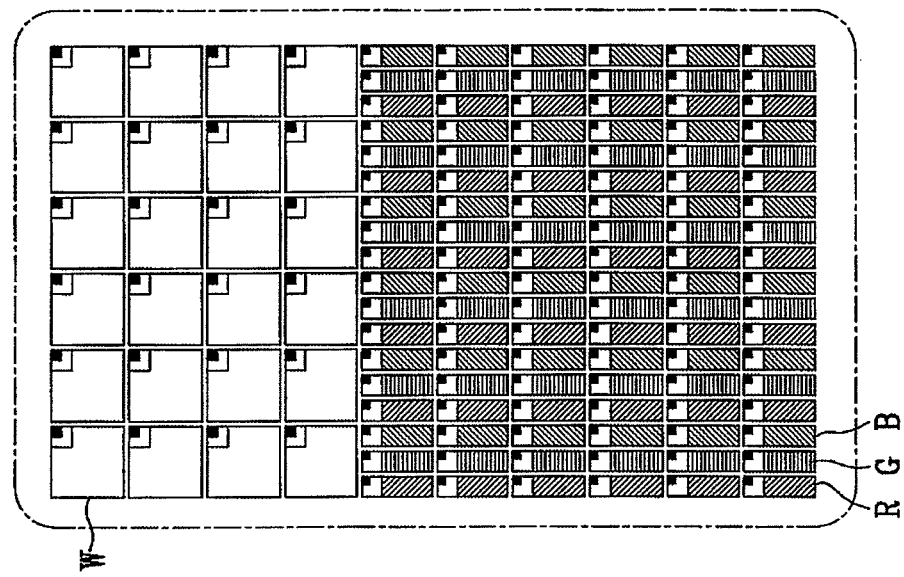
FIG. 10B is a view enlarging a portion A of FIG. 10A.
Figure 10A:
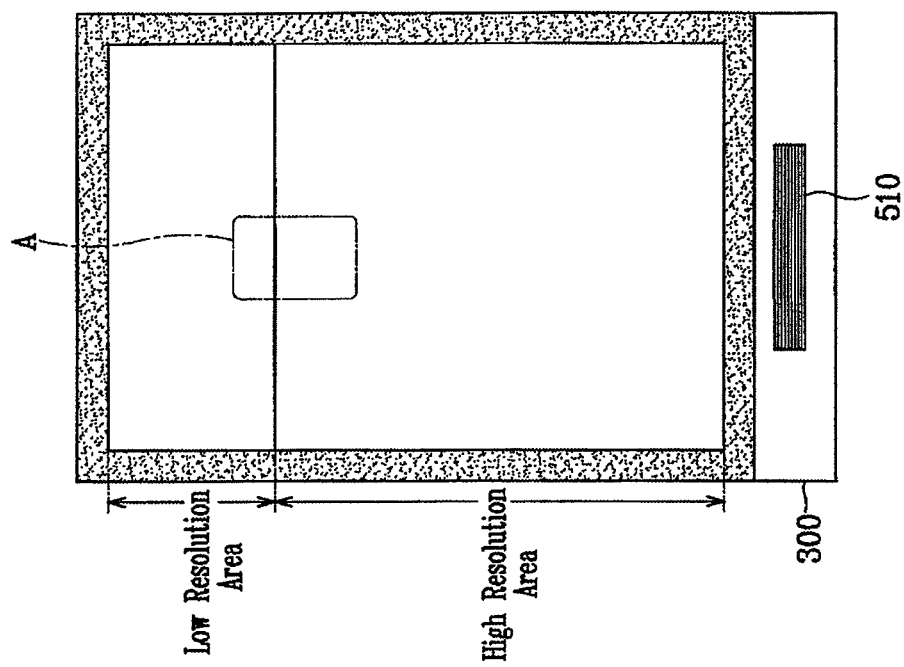
FIG. 10A is a layout view of an LC panel according to another embodiment of the present invention.

FIG. 10A is a layout view of an LC panel according to another embodiment of the present invention and FIG. 10B is a view enlarging a portion A of FIG. 10A.

Referring to FIG. 10A and FIG. 10B, an LCD of this embodiment includes a high-resolution area and a low-resolution area. In the high-resolution area, R, G, and B color filters are alternately provided at each pixel for color display. In the low-resolution area, color filters are not provided or W (white) color filters, comprising, for example, a transparent photoresist film or the like, are provided at each pixel to exhibit black and white. Here, a pixel formed in the low-resolution area is three times as large as a pixel formed in the high-resolution area.

As explained above, when the area of a pixel formed in the low-resolution area is larger than the area of a pixel formed in the high-resolution area, for example, the area of a pixel in the low-resolution area is equal to the sum area of three pixels formed in the high-resolution area, and color filters are not provided or white color filters only are provided in the low-resolution area, light efficiency of the low-resolution area increases since the aperture ratio of the pixels increases and light absorption caused by the RGB color filters is not generated. Without the RGB color filters, the light transmittance increases almost three times and the aperture ratio also increases. Accordingly, according to the present embodiment, the low-resolution area obtains light efficiency approximately four times higher than that of the high-resolution area.

A set of R, G, and B pixels formed in the high-resolution area, each being represented as a dot, corresponds to a pixel formed in the low-resolution area, and therefore a matrix of such sets formed in the high-resolution area corresponds to a matrix of pixels formed in the low-resolution area. Accordingly, all pixels formed in the low-resolution area can receive image signals from the data lines, which traverse the two areas and supply image signals to the green pixels G formed in the high-resolution area.

In this structure, according to an embodiment of the present invention, when the data lines connected to the green pixels G of the high-resolution area are connected to the pixels of the low-resolution area, the low-resolution area can exhibit black and white without any particular variation of the driving method or any image processing.

Further, as shown in FIG. 6, when the gate driver 412 for driving the high-resolution area and the gate driver 411 for driving the low-resolution area are respectively provided to drive the two areas separately, and the data driving chip 510 is only operated in the still mode in order for the image display to be realized only at the low-resolution area, power saving is possible by a factor of about 90%.

FIG. 11A is a layout view of an LC panel according to another embodiment of the present invention and FIG. 11B is a view enlarging a portion A of FIG. 11A.

Referring to FIG. 11A and FIG. 11B, an LCD of this embodiment is divided into a high-resolution and a low-resolution area. The low-resolution area is further divided into two areas, an area having red color filters R and an area having blue filters B. In the high-resolution area, R, G, and B color filters are alternately provided at each pixel to realize color display. Here, a pixel formed in the low-resolution area is three times as large as a pixel formed in the high-resolution area.

In this structure, the R, G, and B color filters may be formed all over the low-resolution area. Alternatively, after the low-resolution area is divided into the areas as shown in FIG. 11B, different color filters may be formed at each area.

The low-resolution area may exhibit different colors according to a kind of information, for example, in time information may be blue, antenna information may be green, and the battery charging state may be red.

Figure 12B:
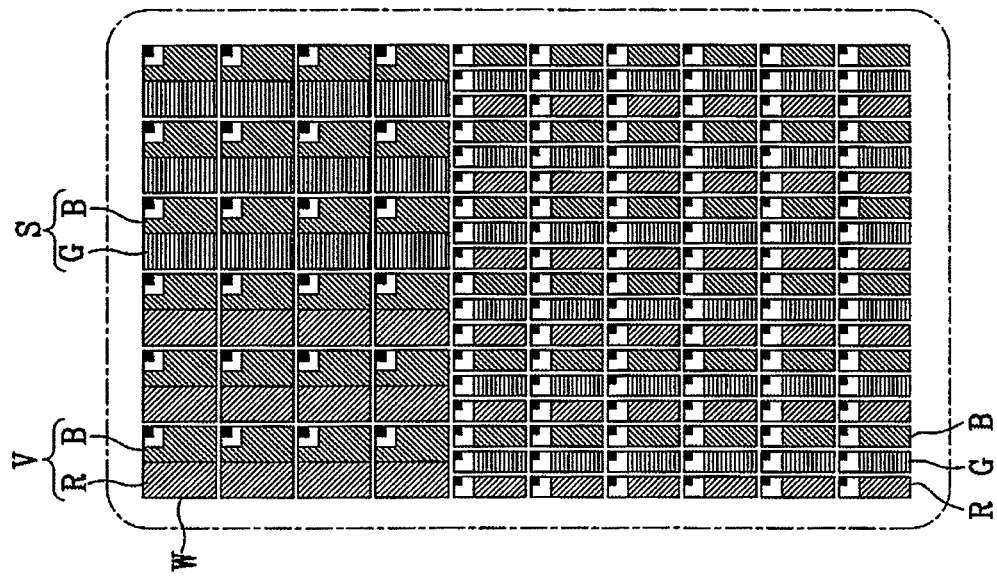
FIG. 12B is a view enlarging a portion A of FIG. 12A.
Figure 12A:
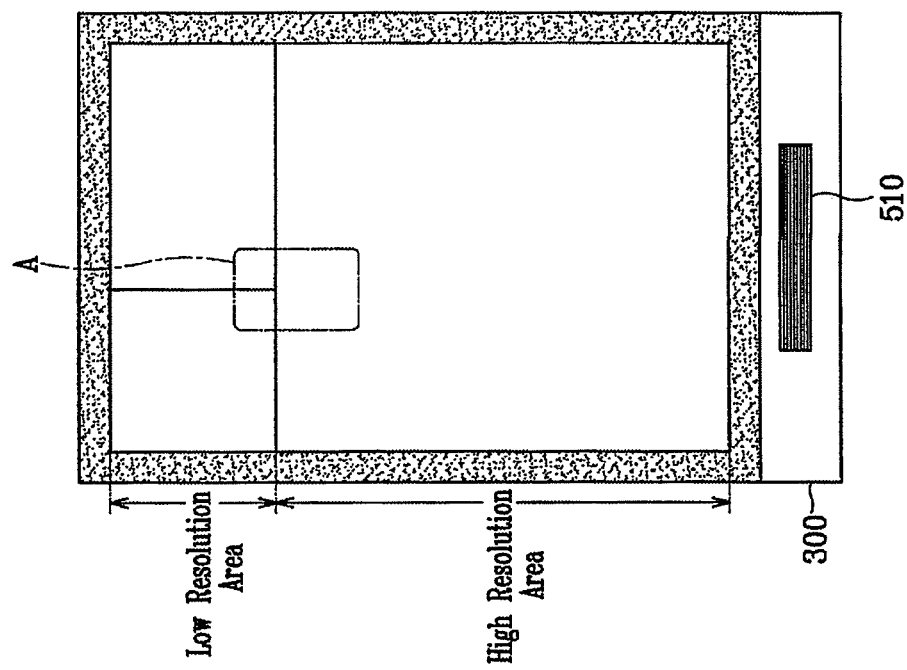
FIG. 12A is a layout view of an LC panel according to another embodiment of the present invention.

FIG. 12A is a layout view of an LC panel according to another embodiment of the present invention and FIG. 12B is a view enlarging a portion A of FIG. 12A.

Referring to FIG. 12A and FIG. 12B, an LCD of this embodiment is divided into a high-resolution and a low-resolution area. The low-resolution area is divided into two areas. In one area, each pixel is provided with a red color filter R and a blue filter B, each occupying a half of the pixel. In the other area, each pixel is provided with a green color filter G and a blue filter B, each occupying a half of the pixel. In the high-resolution area, R, G, and B color filters are alternately provided at each pixel to realize the color display. Here, a pixel formed in the low-resolution area is three times as large as a pixel formed in the high-resolution area.

A method for realizing color display in the low-resolution area is to display different colors in the respective areas after dividing the low-resolution area into more than three areas. Another method is to display only one color all over the low-resolution area. Further, as shown in FIG. 11B, a monochrome area may be included in the low-resolution area.

The above-mentioned methods enable, for example, the displayed images in the low-resolution area to have colors different from the primary colors (i.e., red, green and blue). For example, when the color filters are disposed as shown in FIG. 12B, a left portion of the low-resolution area exhibits violet V, while a right portion exhibits sky blue S.

Figure 13:
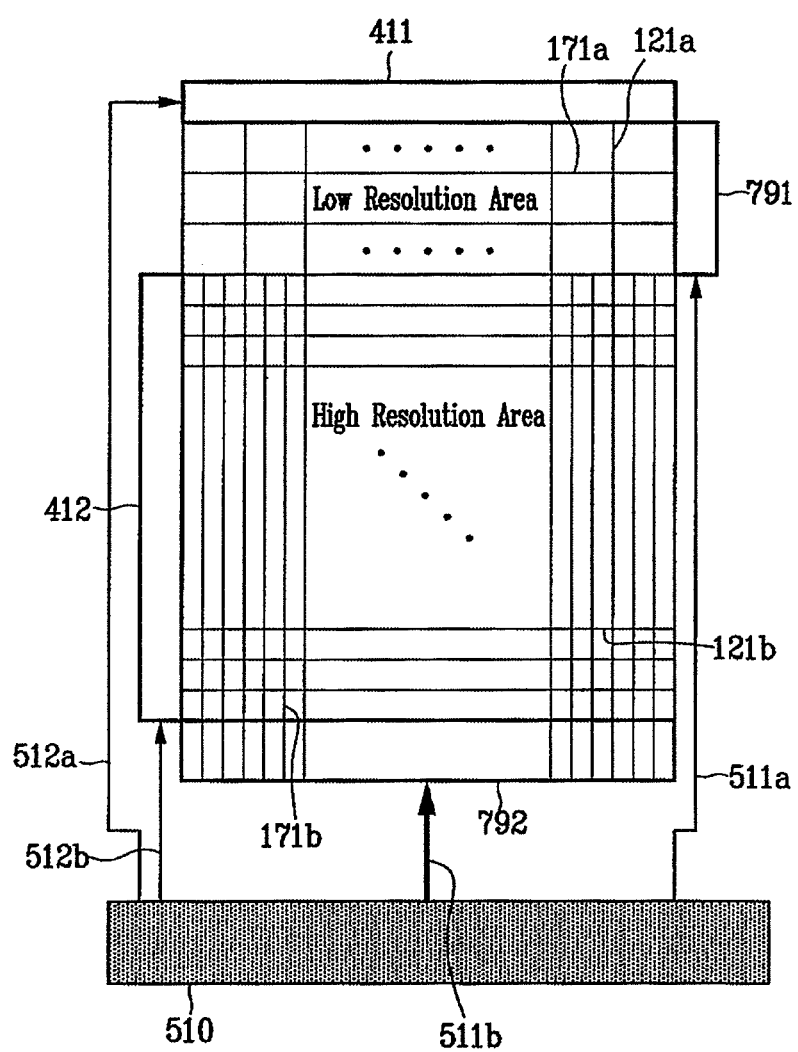
FIG. 13 is a layout view of a driving circuit of an LCD according to another embodiment of the present invention.

FIG. 13 is a layout view of a driving circuit of an LCD according to another embodiment of the present invention.

Referring to FIG. 13, data lines 171a of a low-resolution area and data lines 171b of a high-resolution area are formed in different ways. In detail, the data lines 171b of the high-resolution area extend in a vertical direction and the data lines 171a of the low-resolution area extend in a horizontal direction to be perpendicular to the data lines 171b. Accordingly, an access-from part 792 of the data line 171b is provided at a lowermost portion of the high-resolution area to be connected to the data driver 510, while an access-from part 791 of the data line 171a is provided at the right of the low-resolution area.

The access-from part 791 of the low-resolution area and the access-from part 792 of the high-resolution area receive image signals from the data driver 510 through wires 511a and 511b separately provided.

Gate lines 121a of the low-resolution area extend in a vertical direction to be perpendicular to the data lines 171a, and gate lines 121b of the high-resolution area extend in a horizontal direction to be perpendicular to the data lines 171b. Accordingly, a gate driver 411 of the low-resolution area is provided at a top of the low-resolution area, while a gate driver 412 of the high-resolution area is provided at the left of the high-resolution area. Here, the gate drivers 411 and 412 may be individually mounted on each corresponding area of a TFT panel 100, having the shape of chips, or may be directly integrated into each corresponding area.

The low-resolution area of this embodiment is shaped as a horizontally long band, and the data lines 171a are formed in a length direction of the low-resolution area, namely, in a horizontal direction. Accordingly, the number of the data lines 171a allowable in this low-resolution area is less than that when they are formed in a width direction of the low-resolution area, namely, in a vertical direction. For example, in an LCD having the resolution of 128×160, when the data lines 171a of the low-resolution area are formed in a width direction, an allowable number of the data lines 171a is 128×3 within such an area. Conversely, when the data lines 171a are formed in a length direction of the low-resolution area as in the present embodiment, an allowable number of the data lines 171a is 32 (obtained by subtracting 128 from 160). In this case, however, the number of the gate lines 121a increases.

When the number of the data lines 171a of the low-resolution area is reduced as mentioned in the above, the number of the wires 511a for connecting the data driver 510 to the access-from part 791 of the low-resolution area is also reduced. In view of design, such a reduction of the wires 511a facilitates an arrangement of the wires.

Meanwhile, even if the number of the gate lines 121a increases, the number of the wires 512a for connecting the data driver 510 to the gate driver 411 is nevertheless unchanged, since the gate driver 411, for supplying scanning signals to the gate lines 121a, is provided at the top of the low-resolution area and a kind of signals applied to the gate driver 411 through the data driver 510 is unchanged, regardless of the change of the number of gate lines 121a.

As mentioned in the above, in accordance with embodiments of the present invention, a low-resolution area and a high-resolution area are formed in the LCD panel and some information of fixed patterns that need displaying at all times, are displayed in the low resolution area of the two areas.

Accordingly, the present invention allows certain types of information to be displayed at all times, while power consumption is reduced.

Some margin in a manufacturing process can be expected by adopting gate drivers capable of separately driving the high-resolution area and the low-resolution area, with efficiently designed wires.

An LCD according to another embodiment of the present invention will be described in detail with reference to FIG. 1, FIG. 14, and FIG. 15.

Figure 14:
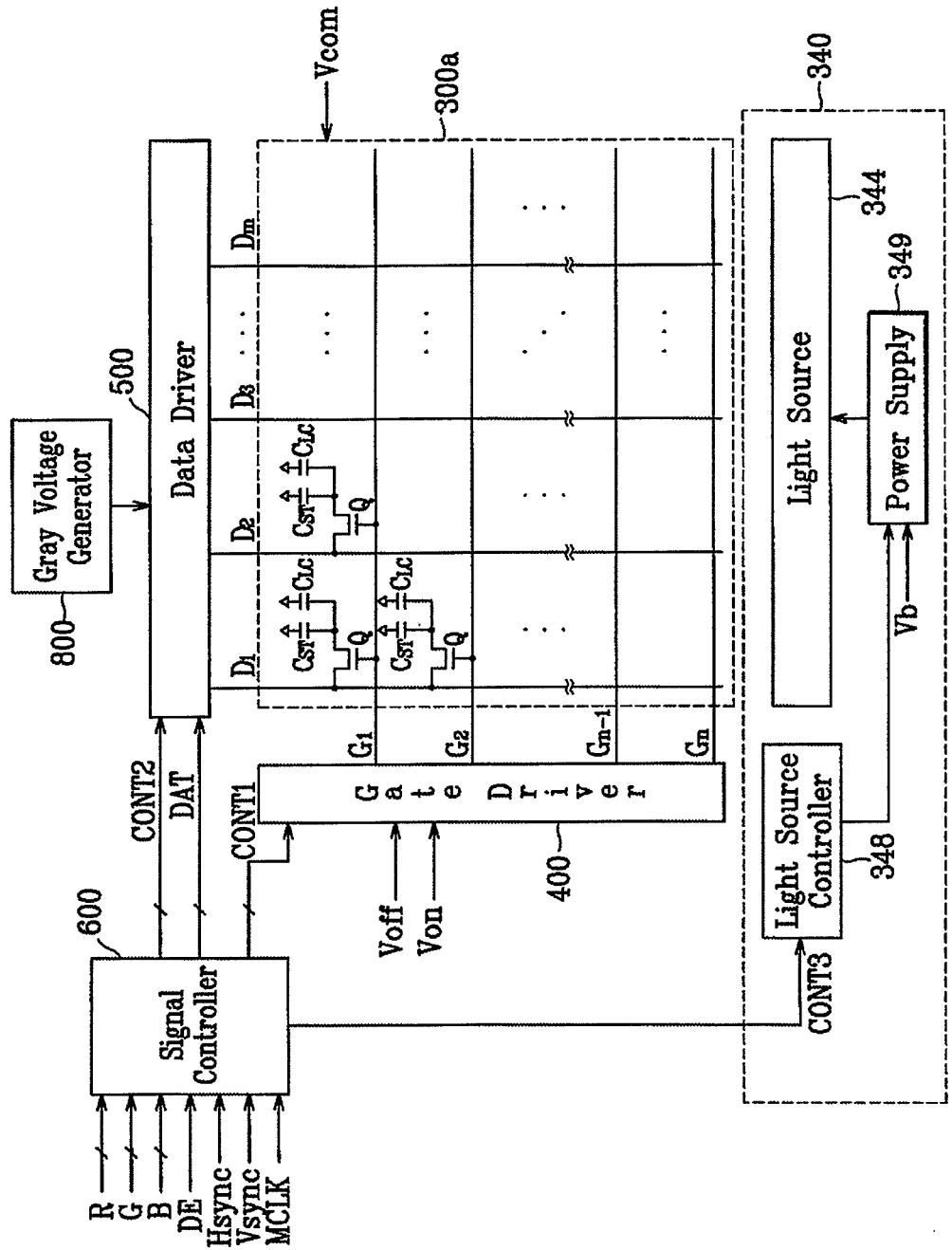
FIG. 14 is a block diagram of an LCD according to another embodiment of the present invention.
Figure 15:
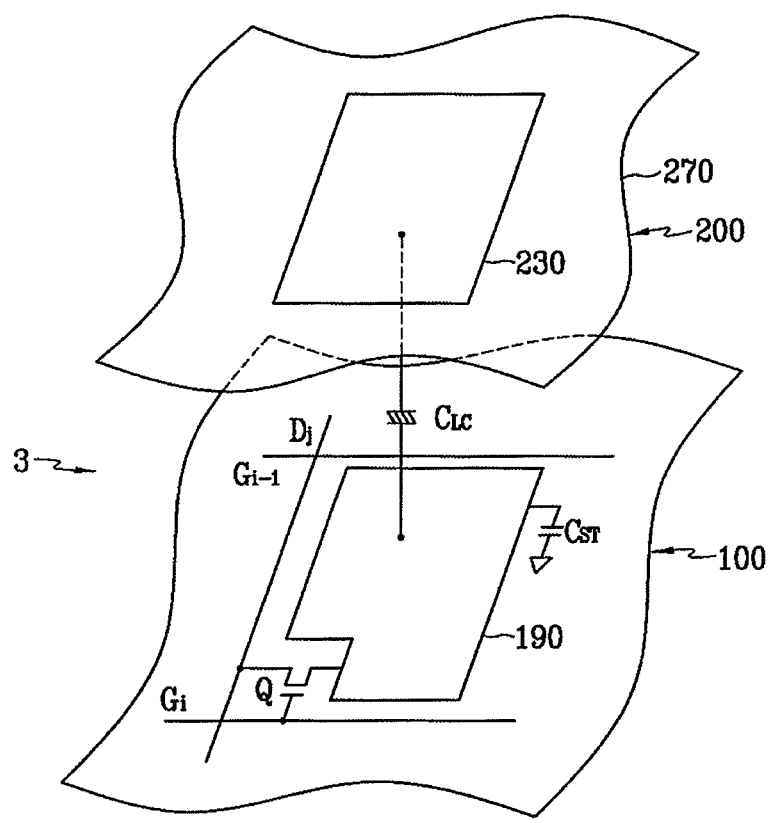
FIG. 15 is an equivalent circuit view of a pixel unit of an LCD according to another embodiment of the present invention.

FIG. 14 is a block diagram of an LCD according to another embodiment of the present invention and FIG. 15 is an equivalent circuit view of a pixel unit of an LCD according to another embodiment of the present invention.

Referring to FIG. 1 again, an LCD includes an LC panel assembly 330 for displaying images using light, a backlight assembly 340 for producing light, a selective reflection film 347 provided between the LC panel assembly 330 and the backlight assembly 340, a mold frame 364 for receiving the LC panel assembly 330, the selective reflection film 347, and the backlight assembly 340 therein, and an upper chassis 361 and a lower chassis 362 that surround and support the above-mentioned elements.

The LC panel assembly 330 includes an LC panel 300, a driving chip 510, and a malleable circuit board 550.

The LC panel 300 includes a lower panel 100 and an upper panel 200 facing each other, and an LC layer (not shown) interposed therebetween.

Referring to FIG. 14, the lower panel 100 includes a plurality of display signal lines $G_1$-$G_n$ and $D_1$-$D_m$. The lower panel 100 and the upper panel 200 include a plurality of pixels connected to the display signal lines $G_1$-$G_n$, and $D_1$-$D_m$ and arranged substantially in a matrix.

The display signal lines $G_1$-$G_n$ and $D_1$-$D_m$ include a plurality of gate lines $G_1$-$G_n$ for transmitting gate signals (also referred to as "scanning signals"), and a plurality of data lines $D_1$-$D_m$ for transmitting data signals. The gate lines $G_1$-$G_n$ extend substantially in a row direction and substantially parallel to each other, while the data lines $D_1$-$D_m$ extend substantially in a column direction and substantially parallel to each other.

Each pixel includes a switching element Q that is connected to the display signal lines $G_1$-$G_n$ and $D_1$-$D_m$, and an LC capacitor $C_{LC}$ and a storage capacitor $C_{ST}$ that are connected to the switching element Q. The storage capacitor $C_{ST}$ may be omitted.

The switching element Q, such as a thin film transistor (TFT), is provided on the lower panel 100 and has three terminals: a control terminal connected to one of the gate lines $G_1$-$G_n$; an input terminal connected to one of the data lines $D_1$-$D_m$; and an output terminal connected to both of the LC capacitor $C_{LC}$ and the storage capacitor $C_{ST}$.

As shown in FIG. 15, the LC capacitor $C_{LC}$ includes a pixel electrode 190, provided on the lower panel 100, and a common electrode 270, provided on the upper panel 200, as two terminals. The LC layer 3 interposed between the two electrodes 190 and 270 functions as a dielectric of the LC capacitor $C_{LC}$. The pixel electrode 190 is connected to the switching element Q, and the common electrode 270 is supplied with a common voltage $V_{com}$, and covers the entire surface of the upper panel 200. Differing from FIG. 15, the common electrode 270 may be provided on the lower panel 100. In this case, at least one of the pixel electrode 190 and the common electrode 270 may be shaped as a bar or a stripe.

The storage capacitor $C_{ST}$ is an auxiliary capacitor for the LC capacitor $C_{LC}$. When the pixel electrode 190 and a separate signal line (not shown), which is provided on the lower panel 100, are overlapped with each other, with an insulator interposed therebetween, the overlapped portion becomes the storage capacitor $C_{ST}$. The separate signal line is supplied with a predetermined voltage such as the common voltage $V_{com}$. Alternatively, the storage capacitor $C_{ST}$ may be formed by overlapping of the pixel electrode 190 and a previous gate line that is placed directly before the pixel electrode 190, with an insulator interposed therebetween.

For color display, each pixel must exhibit a color. This is possible when each pixel includes a color filter 230 capable of exhibiting one of the primary colors, red, green, and blue, in an area of the upper panel 200 corresponding to the pixel electrode 190. In FIG. 14, the color filter 230 is provided on the upper panel 200, but it may be provided on or under the pixel electrode 190 of the lower panel 100.

A polarizer (not shown) is provided on at least one outer surface of the two panels 100 and 200 of the LC panel 300 for polarizing the light emitted from the two-dimensional light source units.

The gate drivers 400 are individually connected to the gate lines $G_1$-$G_n$ for transmitting the gate signals, consisting of combinations of the gate-on voltage $V_{on}$ and the gate-off voltage $V_{off}$ input from an external device, to the gate signal lines $G_1$-$G_n$. The gate drivers 400 are integrated into the lower panel 100 with the switching element Q and the display signal lines $G_1$-$G_n$ and $D_1$-$D_m$.

The driving chip 510 is directly mounted on the lower panel 100 of the LC panel 300, having the shape of an IC chip, as shown in FIG. 1, and includes a signal controller 600, a data driver 500 connected to the signal controller 600, and a gray voltage generator 800 connected to the data driver 500.

The gray voltage generator 800 generates two sets of a plurality of gray voltages related to the transmittance of the pixels. The gray voltages in one set have positive polarity with respect to the common voltage $v_{com}$, while those of the other set have negative polarity with respect to the common voltage $v_{com}$.

The data driver 500 is connected to the data lines $D_1$-$D_m$ of the LC panel 300 for transmitting the data voltages, which are selected from the gray voltages supplied from the gray voltage generator 800, to the data signal lines $D_1$-$D_m$.

The signal controller 600 controls the operation of the gate driver 400 or the data driver 500.

The backlight assembly 340 is provided under the LC panel assembly 330 for offering a uniform light to the LC panel 300.

The backlight assembly 340 includes a light source part 344 for producing light, a light guiding plate 342 for guiding a proceeding path of light, optical sheets 343 for uniformly dispersing the light input from the light guiding plate 342, a reflection plate 341 for reflecting light leaked from the light guiding plate 342, a light source controller 348 connected to the signal controller 600, and a power supply part 349 connected to the light source controller 348 and the light source part 344.

Figure 18:
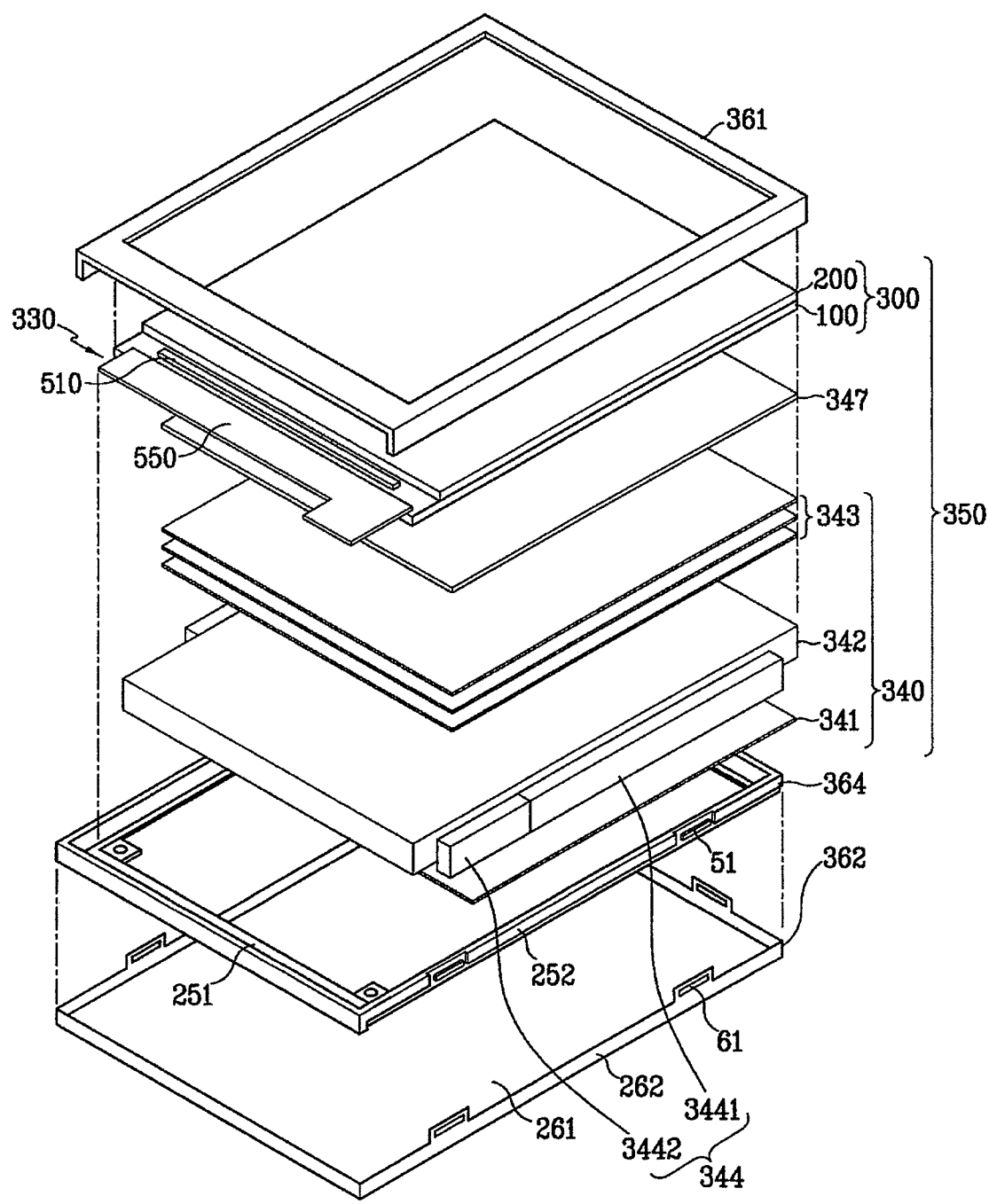
FIG. 18 is an exploded perspective view schematically illustrating an LCD according to another embodiment of the present invention.

The light source part 344 includes a main light source 3441 and a sub light source 3442, which are placed on two sides of the light guiding plate 342 to emit light toward the light guiding plate 342 (see FIG. 18). The main light source 3441 and sub light source 3442 may freely exchange their locations. This light source part 344 may utilize light emitting diodes (LEDs), of which power consumption is relatively low, or fluorescent lamps such as, for example, cold cathode fluorescent lamps (CCFLs) or external electrode fluorescent lamps (EEFLs). The number of the LEDs may be controlled.

The light source controller 348 controls the operation of the power supply part 349 in response to control signals from the signal controller 600.

The power supply part 349 supplies a driving voltage to the light source part 344 according to the operation of the light source controller 348.

The light guiding plate 342 has a light guiding pattern (not shown) capable of directing light toward a display region of the LC panel 300.

The optical sheets 343 are provided between the light guiding plate 342 and the LC panel 300. These optical sheets 343 disperse the incident light from the light guiding plate 342 uniformly and then supply it to the LC panel 300.

The selective reflection film 347 is provided between the LC panel assembly 330 and the backlight assembly 340. This reflection film 347 reflects the ambient light toward the LC panel 300 when the light source 344 is turned off, in order for the images to be displayed on the display region in such a case. This is possible because the reflection film 347 is designed to transmit or reflect light, selectively. That is, when the light source 344 is turned on, the reflection film 347 transmits the incident light from the backlight assembly 340 and supplies it to the LC panel 300. Conversely, when the light source 344 is turned off, the reflection film 347 reflects the ambient light, entering through the LC panel 300, toward the LC panel 300, in order for the images to be displayed on the display region.

The reflection plate 341 is provided under the light guiding plate 342. The light leaked from the light guiding plate 342 is reflected by this reflection plate 341 and returned toward the light guiding plate 342, thereby improving light efficiency.

The mold frame 364 receives, in order, the reflection plate 341, the light guiding plate 342, the optical sheets 343, and the LC panel 300. The mold frame 364, comprising, for example, resin plastics, is provided with an open bottom 251 and sidewalls 252 extending from the bottom 251.

The malleable circuit board 550 is curved along an outer portion of the sidewalls 252 of the mold frame 364. A plurality of first protrusions 51 are formed on the outer portion of the sidewalls 252 of the mold frame 364, which are combined with the lower chassis 362.

The lower chassis 362, comprising a metallic material, defines a space for accommodating the mold frame 364 therein, with a bottom 261 and sidewalls 262 extending upward from the bottom 261. A plurality of grooves 61 are formed on the sidewalls 262 of the lower chassis 362, and are combined with the protrusions 51 of the mold frame 364.

When the mold frame 364 is combined with the lower chassis 362, part of the sidewalls 262 of the lower chassis 362 are placed on the outer sidewalls 252 of the mold frame 364, and each of the first protrusions 51 is inserted through the respective grooves 61 of the lower chassis 362. At this time, it is preferable to form portions of the mold frame 364, that contact the sidewalls 262 of the lower chassis 362, such that the mold frame is depressed by an amount equal to about a thickness of the sidewalls 262.

The upper chassis 361 is provided above the LC panel 300. When the upper chassis 361 is assembled with the lower chassis 362, an effective display region of the LC panel 300 where the image display is realized is kept in an open state. The upper chassis 361 guides a position of the LC panel 300 and then fixes it in the mold frame 364.

Hereinafter, the operation of the above-mentioned LCD will be described.

The signal controller 600 of the driving chip 510 receives input image signals R, G, and B and input control signals for controlling the display thereof, such as, for example, a vertical synchronizing signal $V_{sync}$, a horizontal synchronizing signal $H_{sync}$, a main clock MCLK, and a data enable signal DE, from an external graphic controller (not shown).

In response to the input image signals R, G, and B and the input control signals, the signal controller 600 processes the image signals R, G, and B suitably for the operation of the LC panel 300 and generates gate control signals CONT1 and data control signals CONT2, and then outputs the gate control signals CONT1 and the data control signals CONT2 to the gate driver 400 and the data driver 500, respectively.

The gate control signals CONT1 include a vertical synchronizing start signal STV for informing the output of the gate-on voltage $V_{on}$, and at least one clock signal for controlling the output time and the output voltage of the gate-on voltage $V_{on}$.

The data control signals CONT2 include a horizontal synchronizing start signal STH for informing the beginning of data transmission, a load signal LOAD for instructing application of the data voltages to the data lines $D_1$-$D_m$, a reverse signal RVS for reversing the polarity of the data voltages with respect to the common voltage $V_{com}$, and a data clock signal HCLK.

Responsive to the data control signals CONT2 from the signal controller 600, the data driver 500 successively receives the image data DAT for a row of the pixels from the signal controller 600, converts the image data DAT into analog data voltages selected from the gray voltages from the gray voltage generator 800, and then applies the data voltages to data lines $D_1$-$D_m$ of the LC panel 300.

The gate driver 400 applies the gate-on voltage $V_{on}$ to the gate lines $G_1$-$G_n$ in response to the gate control signals CONT1 from the signal controller 600, thereby turning on the switching elements Q connected thereto. The data voltages applied to the data lines $D_1$-$D_m$ are applied to the corresponding pixel through the activated switching elements Q.

The difference between the data voltage applied to the pixel and the common voltage $V_{com}$, is represented as a voltage across the LC capacitor $C_{LC}$, namely, a pixel voltage. The LC molecules in the LC capacitor $C_{LC}$ have orientations depending on the magnitude of the pixel voltage.

The backlight assembly 340 controls switching of the light source (e.g., LED) 344, based on a backlight control signal CONT3 that is applied from an exterior device according to the operation of the selected switching element Q or the operation of the LCD. Such an operation of the backlight assembly 340 will be described next. The backlight control signal CONT3 may be applied from the signal controller 600.

When the light emitted from the LED 344 passes through the LC layer 3, the polarization of the light is varied according to the orientations of the LC molecules. The polarizer converts the difference of the light polarization into a difference of the light transmittance.

By repeating this procedure by a unit of the horizontal period (which is denoted by "1H" and equal to one period of the horizontal synchronizing signal $H_{sync}$, the data enable signal DE, and the gate clock CPV), all gate lines $G_1$-$G_n$ are sequentially supplied with the gate-on voltage $V_{on}$ during a frame, thereby applying the data voltages to all pixels. When the next frame starts after finishing one frame, the reverse control signal RVS applied to the data driver 500 is controlled such that the polarity of the data voltages is reversed with respect to that of the previous frame (which is referred to as "frame inversion"). The reverse control signal RVS may also be controlled such that the polarity of the data voltages flowing along a data line in one frame is reversed (for example, line inversion and dot inversion), or the polarity of the data voltages in one packet is reversed (for example, column inversion and dot inversion).

Hereinafter, the operation of the backlight assembly 340 will be described with reference to FIG. 14, FIG. 16, FIG. 17A, and FIG. 17B.

Figure 16:
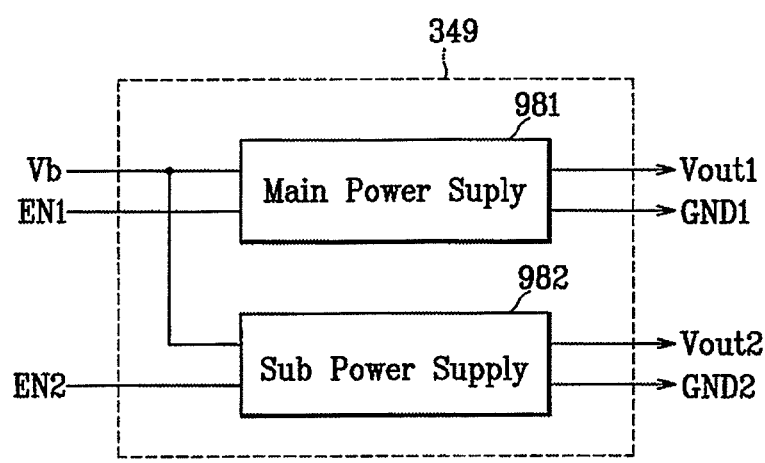
FIG. 16 is a block diagram of a power supply part according to an embodiment of the present invention.
Figure 17A:
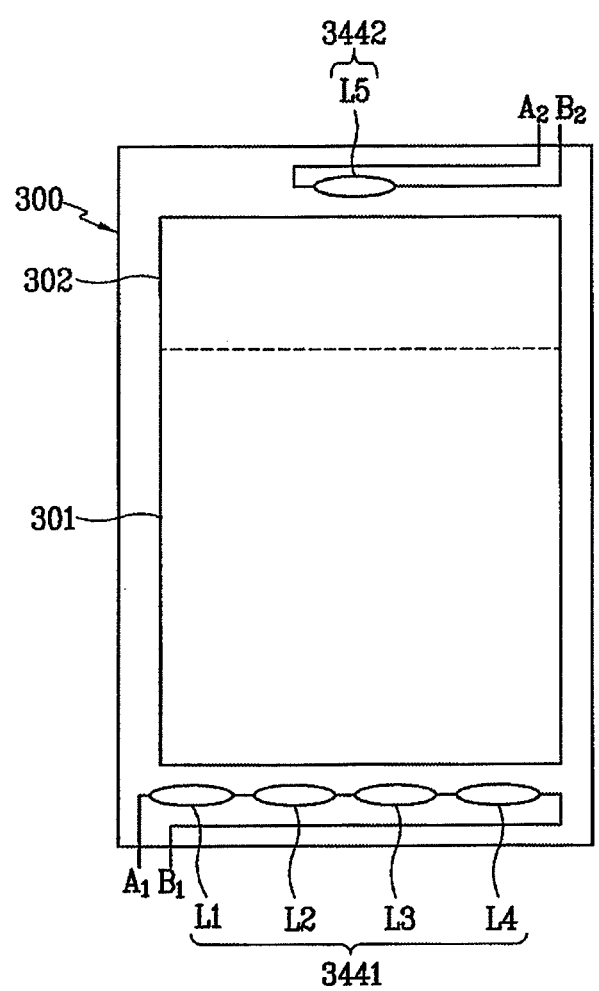
FIG. 17A and FIG. 17B are views for comparing arrangements of two main light sources respectively provided in two LCDs according to an embodiment of the present invention.
Figure 17B:
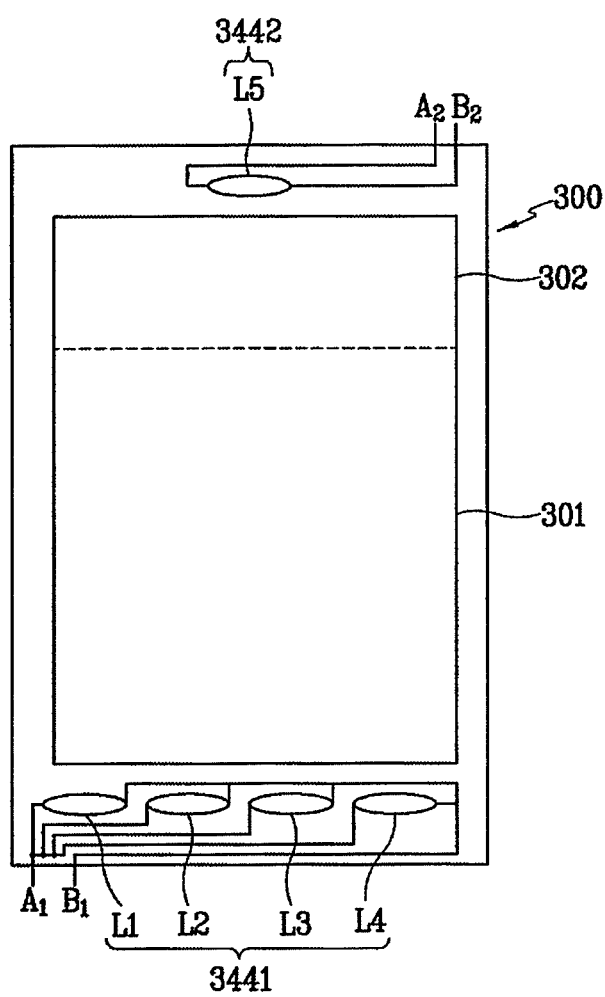

FIG. 16 is a block diagram of a power supply part according to an embodiment of the present invention, and FIG. 17A and FIG. 17B are views for comparing arrangements of two main light sources individually provided in two LCDs according to embodiments of the present invention.

As illustrated in the above with reference to FIG. 14, the backlight assembly 340 includes the light source controller 348, the power supply part 349 connected to the light source controller 348, the light source part 344 that is connected to the power supply part 349 and includes the main light source 3441 and the sub light source 3442.

As shown in FIG. 16, the power supply part 349 includes a main power supply part 981 and a sub power supply part 982.

The main power supply part 981 receives an input voltage $V_b$ from a portable energy source (not shown) such as, for example, a battery, and a control signal EN1 from the light source controller 348, and then outputs a driving voltage $V_{out1}$ and a ground voltage GND1 suitable for the operation of the main light source 3441.

The sub power supply part 982 receives an input voltage $V_b$ from a portable energy source (not shown) and a control signal EN2 from the light source controller 348, and then outputs a driving voltage $V_{out2}$ and a ground voltage GND2 suitable for the operation of the sub light source 3442.

The control signals EN1 and EN2 serve as enable signals of the main and sub light sources 3441 and 3442, applied from the light source controller 348, each determining whether to operate the main and sub power supply parts 981 and 982. That is, when the control signal EN1 or EN2 is in "high" level, the corresponding main and sub power supply parts 981 or 982 operate, and when the control signal EN1 or EN2 is in "low" level, the corresponding main and sub power supply parts 981 or 982 do not operate.

Referring to FIG. 17A, the main light source 3441 of the light source part 344 includes a plurality of light sources, namely, four LEDs L1 to L4 connected to each other in series. A driving terminal A1 receives a driving voltage $V_{out1}$ from the main power supply part 981, and a ground terminal B1 receives a ground voltage GND1 from the main power supply part 981.

The sub light source 3442 includes an LED L5. A driving terminal A2 receives a driving voltage $V_{out2}$ from the sub power supply part 982 and a ground terminal B2 receives a ground voltage GND2 from the sub power supply part 982. In the respective main and sub light sources 3441 and 3442, the number of the LEDs may be altered.

The main light source 3441 is switched on or off, depending on the operation of the main power supply part 981. That is, when the operation of the main power supply part 981 begins, the main power supply part 981 supplies the driving voltage $V_{out1}$ and the ground voltage GND1 to the corresponding main light source 3441, so that the corresponding main light source 3441 is switched on. In a reverse case, the main light source 3441 is switched off.

Similarly, the sub light source 3442 is switched on or off, depending on the operation of the sub power supply part 982. That is, when the operation of the sub power supply part 982 begins, the sub power supply part 982 supplies the driving voltage $V_{out2}$ and the ground voltage GND2 to the corresponding sub light source 3442, so that the corresponding sub light source 3442 is switched on. In a reverse case, the sub light source 3442 is switched off.

As shown in FIG. 17A, the display region of the LCD panel 300 according to an embodiment of the present invention is divided into a main display part 301 corresponding to the high-resolution area and a sub display part 302 corresponding to the low-resolution area. In this embodiment, the display region is divided into the two areas on the basis of the resolution, but various standards besides the resolution, for example, dimension of the display region, may also be used to divide the display region.

The main display part 301 is a region where various images can be displayed freely and minutely, while the sub display part 302 is a region where fixed pattern images for informing, for example, time, antenna sensitivity, the remaining battery capacity, are displayed. In spite of having lower resolution, the sub display part 302 has no difficulty in displaying the fixed pattern images since such images can be adequately represented with only minimum or maximum gray.

As shown in FIG. 17A, the main light source 3441 is provided at a lower part of the LC panel 300 adjacent to the main display part 301, in a horizontal direction, and the sub light source 3442 is provided at an upper part of the LC panel 300 adjacent to the sub display part 302. In this case, the LEDs L1 to L4 of the main light source 3441 are arranged to be close to the main display part 301, having regular intervals therebetween, in order to supply uniformly dispersed light to the main display part 301. Similarly, the LED L5 of the sub light source 3442 is arranged at a center of an upper portion of the LCD panel 300, where light emitted from the LED L5 can be most efficiently supplied to the sub display part 302 of the LCD panel 300. However, the arrangements of such LEDs L1 to L5 may be changed.

The operation of the above-mentioned backlight assembly 340 will be described below.

As mentioned above, the main and sub light sources 3441 and 3442 are individually switched on or off, each depending on the operation of the main power supply part 981 and the sub power supply part 982.

That is, in response to a backlight control signal CONT3, the light source controller 348 checks the enable signals EN1 and EN2, each respectively applied to the main power supply part 981 and the sub power supply part 982, and then outputs signals corresponding to the states of the enable signals EN1 and EN2. For example, when all of the main display part 301 and the sub display part 302 are used, the light source controller 348 makes all of the states of the enable signals EN1 and EN2 in high level. Alternatively, only the enable signal EN1 is in a high level when only the main display part 301 is used.

In addition, to display only primary information of a fixed pattern in the sub display part 302, while the main display part 301 has no image, only the enable signal EN2 should be high. When the LCD does not operate for longer than a predetermined time, all of the enable signals EN1 and EN2 are low. Alternatively, the main and sub light sources 3441 and 3442, which are individually activated in response to the enable signals EN1 and EN2, may operate differently from the above-mentioned manner.

When the main power supply part 981 operates according to the state of the corresponding enable signal EN1, the driving voltage $V_{out1}$ is applied to the driving terminal A1 of the corresponding main light source 3441, and the ground voltage GND1 is applied to the ground terminal B1, so that the main light source 3441 is turned on, emitting light toward the corresponding main display part 301. Also, when the sub power supply part 982 operates according to the state of the corresponding enable signal EN2, the driving voltage $V_{out2}$ is applied to the driving terminal A2 of the corresponding sub light source 3442, and the ground voltage GND2 is applied to the ground terminal B2, so that the sub light source 3442 is turned on, emitting light toward the corresponding sub display part 302.

FIG. 17B shows another example of the main light source 3441 according to an embodiment of the present invention. The operation of this example is substantially to the same as that of the example previously illustrated with reference to FIG. 17A, except that the LEDs L1 to L4 are arranged in parallel. In this structure, the main light source 3441 consisting of the LEDs L1 to L4 is switched on or off, according to whether the driving signal $V_{out1}$ and ground voltage GND1 supplied from the main power supply part 981 are applied to the corresponding driving terminal A1 and the corresponding ground terminal B1.

In this way, after the LCD panel 300 is divided into a plurality of areas, the main and sub light sources 3441 and 3442 are individually switched on or off according to the state of each divided area, so that the power consumption caused by unnecessary lighting of the main and sub light sources 3441 and 3442 may be reduced.

An LCD according to another embodiment of the present invention will be described with reference to FIG. 18 through FIG. 19B.

Figure 19A:
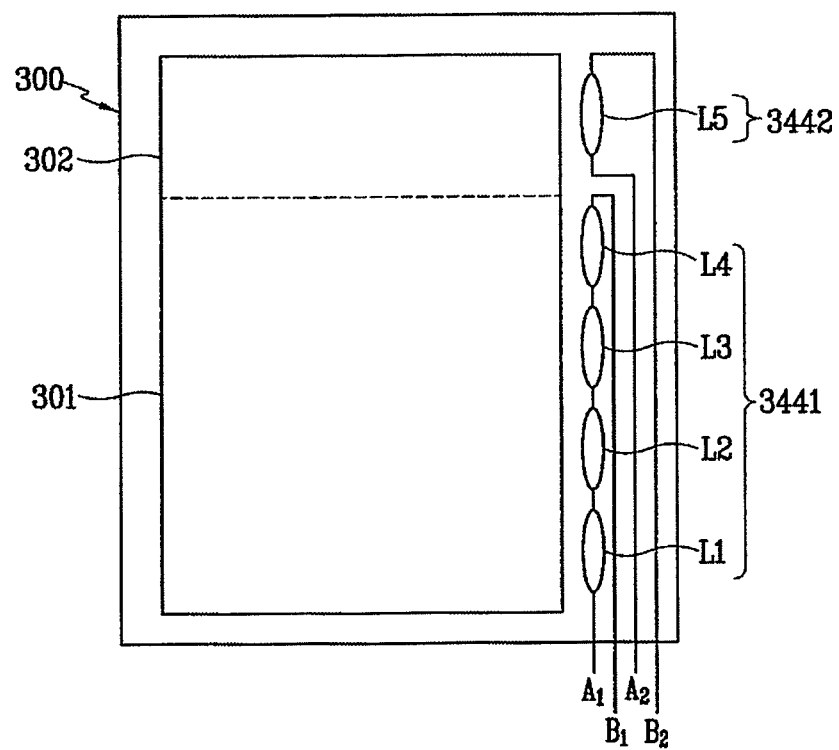
FIG. 19A and FIG. 19B are views for comparing arrangements of two main light sources respectively provided in two LCDs according to another embodiment of the present invention.

FIG. 18 is an exploded perspective view schematically illustrating an LCD according to another embodiment of the present invention. FIG. 19A and FIG. 19B are views for comparing arrangements of two main light sources individually provided in two LCDs according to other embodiments of the present invention.

The LCD of FIG. 18 is substantially the same as the LCD of FIG. 1, except for the positions of the main light source 3441 and the sub light source 3442. That is, the main light source 3441 and the sub light source 3442 are mounted on a long side of the light guiding plate 342 in a row, and they may be mounted on the opposing side.

Figure 19B:
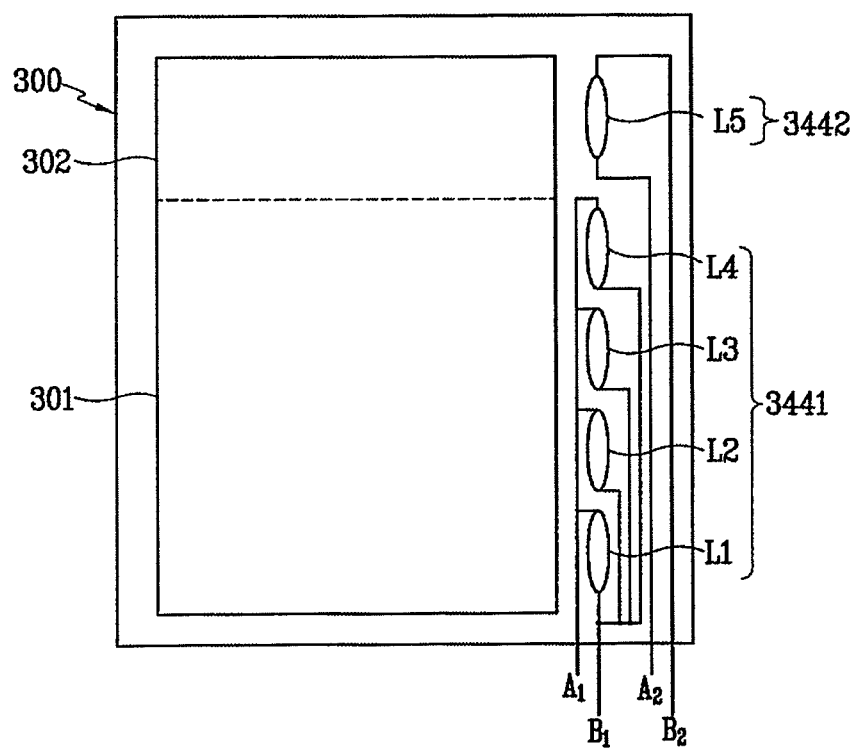

Due to such a structure, in FIG. 19A and FIG. 19B, the LEDs L1 to L5 of the main light source 3441 and the sub light source 3442 are arranged at any one side of the LC panel 300, which is divided into a main display part 301 and a sub display part 302. That is, the LEDs L1 to L4 of the main light source 3441 are arranged at one side of the main display part 301, having regular intervals therebetween, while the LED L5 of the sub light source 3442 is arranged at one side of the sub display part 302. This arrangement enables the light to be supplied to the LCD efficiently. In FIG. 19A and FIG. 19B, the main light source 3441 and the sub light source 3442 are at the right of the LCD panel 300, but they may be at the left.

A difference between FIG. 19A and FIG. 19B is the connection state of the LEDs. Similar to FIG. 17A and FIG. 17B, the LEDs L1 to L4 of FIG. 19A are connected to each other in series, while the LEDs L1 to L4 of FIG. 19B are connected to each other in parallel.

The operation of the main light source 3441 and the sub light source 3442 is the same as the operation previously illustrated with reference to FIG. 1 and FIGS. 17A-17B.

According to embodiments of the present invention, the display region of the LCD panel is divided into a main display part and a sub display part, and separate light sources are provided at each display part in order to selectively operate the corresponding light source, according to the operation state of each display part. In this structure, it is possible to selectively drive a portion of the entire light sources, when necessary images must be displayed in only a corresponding display part. Accordingly, power consumption by the light sources is reduced, so that total power consumption of the display device is also reduced.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A display device, comprising:
a low-resolution area comprising a first plurality of data lines and a first plurality of gate lines to form a first plurality of pixels; and
a high-resolution area comprising a second plurality of data lines and a second plurality of gate lines to form a second plurality of pixels, non-overlapping with the first plurality of pixels,
wherein the low-resolution area and the high-resolution area are configured such that the gate lines of the low-resolution area run perpendicularly to the gate lines of the high-resolution area and the data lines of the high-resolution area run perpendicularly to the data lines of the low-resolution area,
wherein each of the pixels of the first plurality of pixels of the low-resolution area is larger than each of the pixels of the second plurality of pixels in the high-resolution area,
wherein each of the second plurality of data lines of the high-resolution area terminates at a first gate line of the first plurality of gate lines of the low-resolution area,
wherein the gate lines of the low-resolution area are driven by a low-resolution gate driver, the gate lines of the high-resolution area are driven by a high-resolution gate driver that is separate from the low-resolution gate driver, and the data lines of the low-resolution area and the data lines of the high-resolution area are driven by a single driving chip, and
wherein the single driving chip is connected to the data lines of the high-resolution area via a second access part that is provided at a lowermost portion of the high-resolution area and is aligned parallel to the single driving chip while the single driving chip is connected to the data lines of the low-resolution area via a first access part that is aligned perpendicular to the single driving chip and is provided to a lateral side of the low-resolution area.

2. The display device of claim 1, wherein each of the pixels of the first plurality of pixels of the low-resolution area is about three times as large as each of the pixels of the second plurality of pixels in the high-resolution area.

3. The display device of claim 2, wherein a matrix of pixels formed in the low-resolution area corresponds to a matrix of pixel groups formed in the high-resolution area, each pixel group consisting of red, green and blue pixels and being represented as a dot in the high-resolution area.

4. The display device of claim 3, wherein only data lines for supplying image signals to green pixels of the high-resolution area extend up to the low-resolution area.

5. The display device of claim 1, wherein the low-resolution area exhibits only white and black.

6. The display device of claim 1, additionally comprising a plurality of monochrome areas, each of the plurality of monochrome areas being low-resolution areas and exhibiting only one color, wherein each of the plurality of monochrome areas exhibits a different color from the other of the plurality of monochrome areas.

7. The display device of claim 6, wherein at least one of the plurality of monochrome areas is comprised of pixels that each have two kinds of color filters.

8. The display device of claim 1, wherein:
the first access part is provided at the right of the low-resolution area, and
the second access part is provided at a lowermost portion of the high-resolution area.

9. The display device of claim 1, wherein a first data line of the first plurality of data lines of the low-resolution area is connected to the first plurality of pixels, a second data line of the second plurality of data lines of the high-resolution area is connected to the second plurality of pixels, and the first data line is substantially perpendicular to the second data line.

* * * * *